(12) United States Patent
Dharia et al.

(10) Patent No.: US 7,551,595 B2
(45) Date of Patent: *Jun. 23, 2009

(54) FAST MACRODIVERSITY SWITCHING IN MOBILE WIRELESS NETWORKS

(75) Inventors: Bhupal Kanaiyalal Dharia, Cupertino, CA (US); Gopal Chillariga, Sunnyvale, CA (US); Ujjal Kumar Ghoshtagore, Long Beach, CA (US); Rohit Kaushal, Cupertino, CA (US); Gerhard Albert Koepf, Boulder, CO (US); Lance Kazumi Uyehara, San Jose, CA (US)

(73) Assignee: Northstar Acquisitions, LLC, Los Altos, CA (US)

( * ) Notice: Subject to any disclaimer, the term of this patent is extended or adjusted under 35 U.S.C. 154(b) by 61 days.

This patent is subject to a terminal disclaimer.

(21) Appl. No.: 11/469,380

(22) Filed: Aug. 31, 2006

(65) Prior Publication Data
US 2007/0066330 A1      Mar. 22, 2007

Related U.S. Application Data

(63) Continuation of application No. 09/836,752, filed on Apr. 17, 2001, now Pat. No. 7,212,515, which is a continuation-in-part of application No. 09/750,592, filed on Dec. 28, 2000, now Pat. No. 7,433,683.

(51) Int. Cl.
*H04B 7/212* (2006.01)
(52) U.S. Cl. .................................... 370/347
(58) Field of Classification Search ............. None
See application file for complete search history.

(56) References Cited

U.S. PATENT DOCUMENTS 5,425,049 A   6/1995   Dent
5,459,759 A   10/1995  Schilling
5,594,943 A   1/1997   Balachandran
5,661,723 A   8/1997   Ueno et al.
5,663,957 A   9/1997   Dent
5,663,958 A   9/1997   Ward
5,715,516 A   2/1998   Howard et al.

(Continued)

FOREIGN PATENT DOCUMENTS

WO     WO 96/08119     3/1996

(Continued)

*Primary Examiner*—Frank Duong

(57) ABSTRACT

Fast macrodiversity switching (FMS) of channels that employ interleaving. The fast macrodiversity switching dynamically switches radio links used for traffic and control channels for a mobile station among a number of base transceiver stations (BTS) without switching the radio resource, using the same frequency and time slot combination (TDMA) in an environment where interleaving is occurring. The fast macrodiversity switching of channels and interleave processing is under control of an interleave manager which is distributed among zone managers. The control by the host and assistant zone managers includes switching down-link signals to and up-link signals from mobile stations among base transceiver stations which include broadcast channels (non-switched) and dedicated (switched) channels that employ interleaving. The dedicated channels are switched as frequently as a signal switch time which can be the frame rate of the up-link signals. The switch time is typically less than 1 second for mobile stations in a GSM system. The interleave processing is implemented in a GSM wireless system for TCH/FS Processing, FACCH/FS Processing and SACCH/FS Processing.

43 Claims, 10 Drawing Sheets

U.S. PATENT DOCUMENTS

| | | | |
|---|---|---|---|
| 5,729,538 | A | 3/1998 | Dent |
| 5,757,787 | A | 5/1998 | Dent |
| 5,757,789 | A | 5/1998 | Dent |
| 5,805,576 | A | 9/1998 | Worley et al. |
| 5,812,539 | A | 9/1998 | Dent |
| 5,862,142 | A | 1/1999 | Takiyasu et al. |
| 5,909,651 | A | 6/1999 | Chander et al. |
| 5,959,984 | A | 9/1999 | Dent |
| 5,974,032 | A | 10/1999 | Snowden et al. |
| 6,005,884 | A | 12/1999 | Cook et al. |
| 6,031,863 | A | 2/2000 | Jusa et al. |
| 6,034,988 | A | 3/2000 | VanderMey et al. |
| 6,049,561 | A | 4/2000 | Pezzlo et al. |
| 6,070,071 | A | 5/2000 | Chavez et al. |
| 6,084,865 | A | 7/2000 | Dent |
| 6,094,575 | A | 7/2000 | Anderson et al. |
| 6,112,058 | A * | 8/2000 | Walters et al. ............ 455/67.11 |
| 6,112,094 | A | 8/2000 | Dent |
| 6,125,125 | A | 9/2000 | Narasimha et al. |
| 6,128,512 | A | 10/2000 | Trompower et al. |
| 6,131,034 | A * | 10/2000 | McLaughlin et al. ........ 455/450 |
| 6,137,784 | A * | 10/2000 | Wallerius et al. ............ 370/328 |
| 6,157,669 | A | 12/2000 | Kotzin |
| 6,175,737 | B1 | 1/2001 | Kao |
| 6,175,743 | B1 | 1/2001 | Alperovich et al. |
| 6,192,038 | B1 | 2/2001 | Wallerius et al. |
| 6,212,387 | B1 | 4/2001 | McLaughlin et al. |
| 6,240,073 | B1 | 5/2001 | Reichman et al. |
| 6,240,125 | B1 | 5/2001 | Andersson et al. |
| 6,246,713 | B1 | 6/2001 | Mattisson |
| 6,249,540 | B1 | 6/2001 | Dicker et al. |
| 6,275,518 | B1 | 8/2001 | Takahashi et al. |
| 6,304,837 | B1 | 10/2001 | Sebire |
| 6,341,124 | B1 | 1/2002 | Johansson et al. |
| 6,349,094 | B1 | 2/2002 | Vastano et al. |
| 6,381,234 | B2 | 4/2002 | Sakoda et al. |
| 6,434,184 | B2 | 8/2002 | Lindsey |
| 6,466,138 | B1 | 10/2002 | Partyka |
| 6,473,442 | B1 | 10/2002 | Lundsjo et al. |
| 6,784,287 | B2 | 11/2002 | Geiger et al. |
| 6,490,262 | B1 | 12/2002 | Hogger |
| 6,522,643 | B1 | 2/2003 | Jacomb-Hood et al. |
| 6,526,027 | B1 | 2/2003 | Yeom |
| 6,597,671 | B1 | 7/2003 | Ahmadi et al. |
| 6,628,946 | B1 | 9/2003 | Wiberg et al. |
| 6,636,550 | B1 | 10/2003 | Hagele et al. |
| 6,700,920 | B1 | 3/2004 | Partyka |
| 6,724,739 | B1 | 4/2004 | Horikoshi et al. |
| 6,799,044 | B1 | 9/2004 | Wesby et al. |
| 6,826,406 | B1 | 11/2004 | Vialen et al. |
| 6,831,913 | B1 | 12/2004 | Vialen |
| 6,850,501 | B1 | 2/2005 | Tiedermann et al. |
| 7,043,244 | B1 * | 5/2006 | Fauconnier ................ 455/442 |
| 2002/0075941 | A1 | 6/2002 | Souissi et al. |
| 2002/0085622 | A1 | 7/2002 | Dhar et al. |
| 2002/0122461 | A1 | 9/2002 | Hervey et al. |
| 2002/0141479 | A1 | 10/2002 | Garcia-Luna-Aceves |
| 2002/0191677 | A1 | 12/2002 | Chen et al. |
| 2003/0026223 | A1 | 2/2003 | Eriksson et al. |
| 2003/0026353 | A1 | 2/2003 | Chen et al. |
| 2003/0045970 | A1 | 3/2003 | Maryanka |
| 2003/0067892 | A1 | 4/2003 | Beyer et al. |
| 2003/0086515 | A1 | 5/2003 | Trans et al. |
| 2003/0174757 | A1 | 9/2003 | Partyka |
| 2004/0203806 | A1 | 10/2004 | Craig et al. |
| 2004/0246929 | A1 | 12/2004 | Beasley et al. |
| 2005/0136923 | A1 | 6/2005 | Alapuranen et al. |

FOREIGN PATENT DOCUMENTS

| | | |
|---|---|---|
| WO | WO 98/36509 | 8/1998 |
| WO | WO 98/48529 | 10/1998 |
| WO | WO 98/54850 | 12/1998 |
| WO | WO 99/13652 | 3/1999 |
| WO | WO 00/60892 | 10/2000 |
| WO | WO 00/76251 | 12/2000 |

* cited by examiner

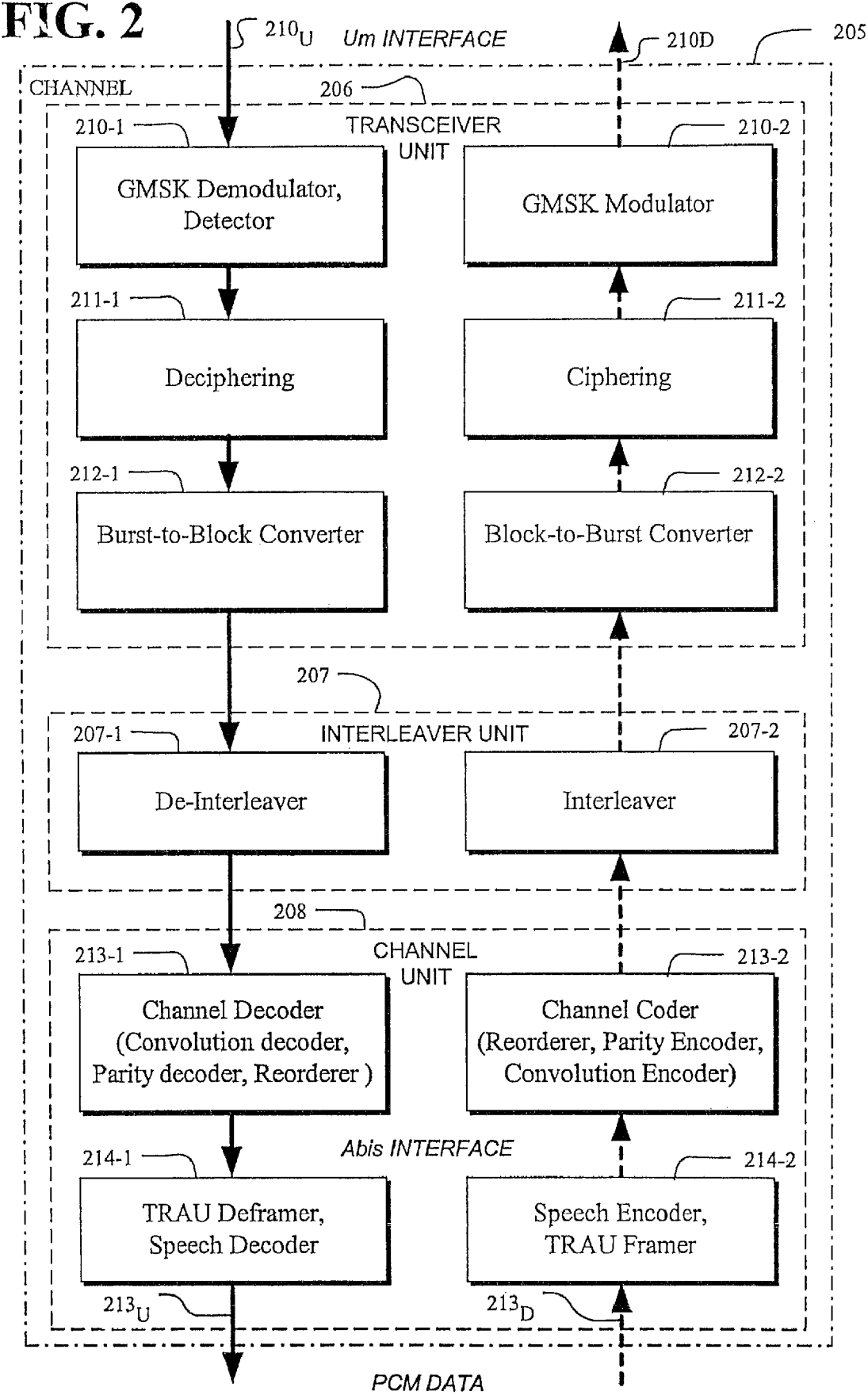

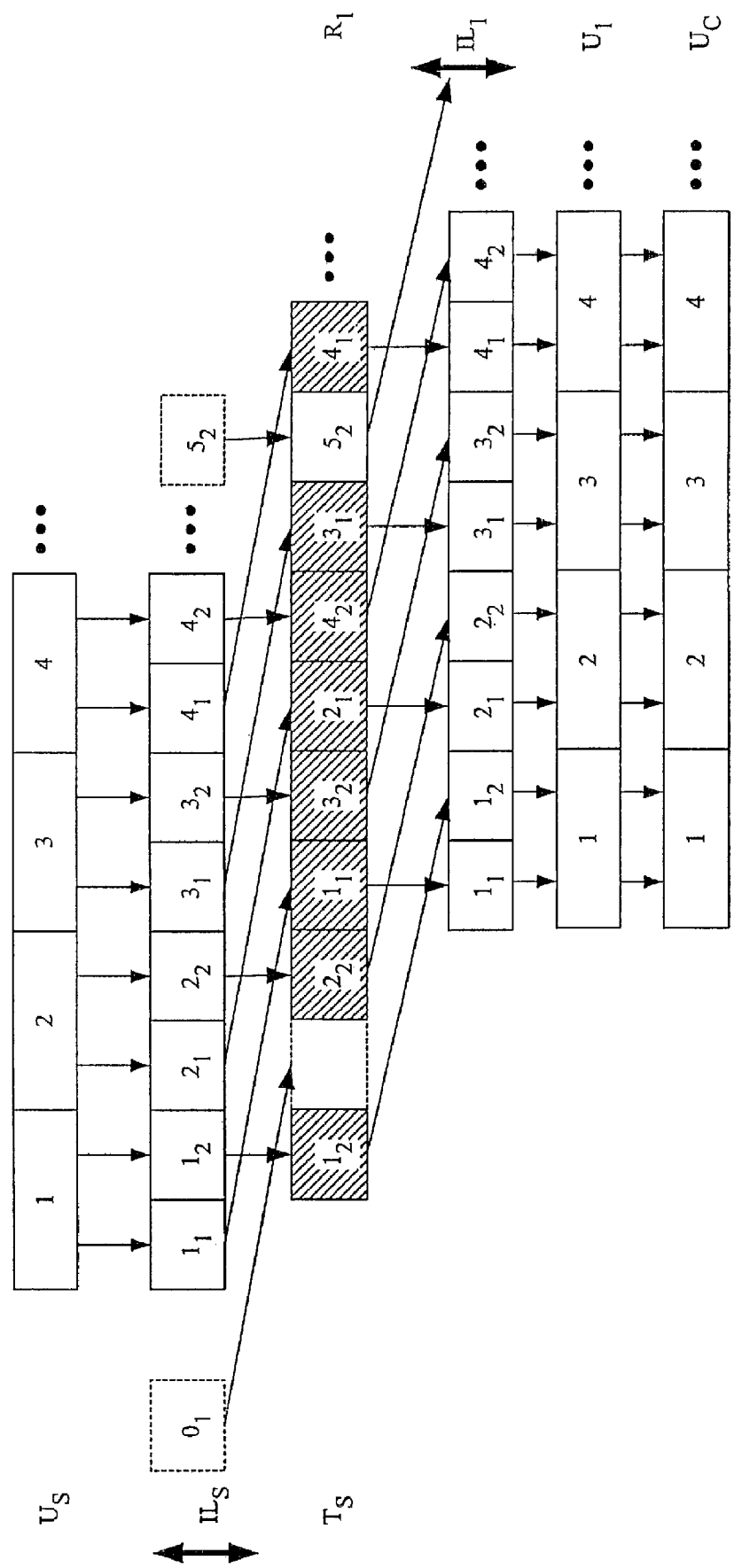
FIG. 3    UPLINK (no switch)

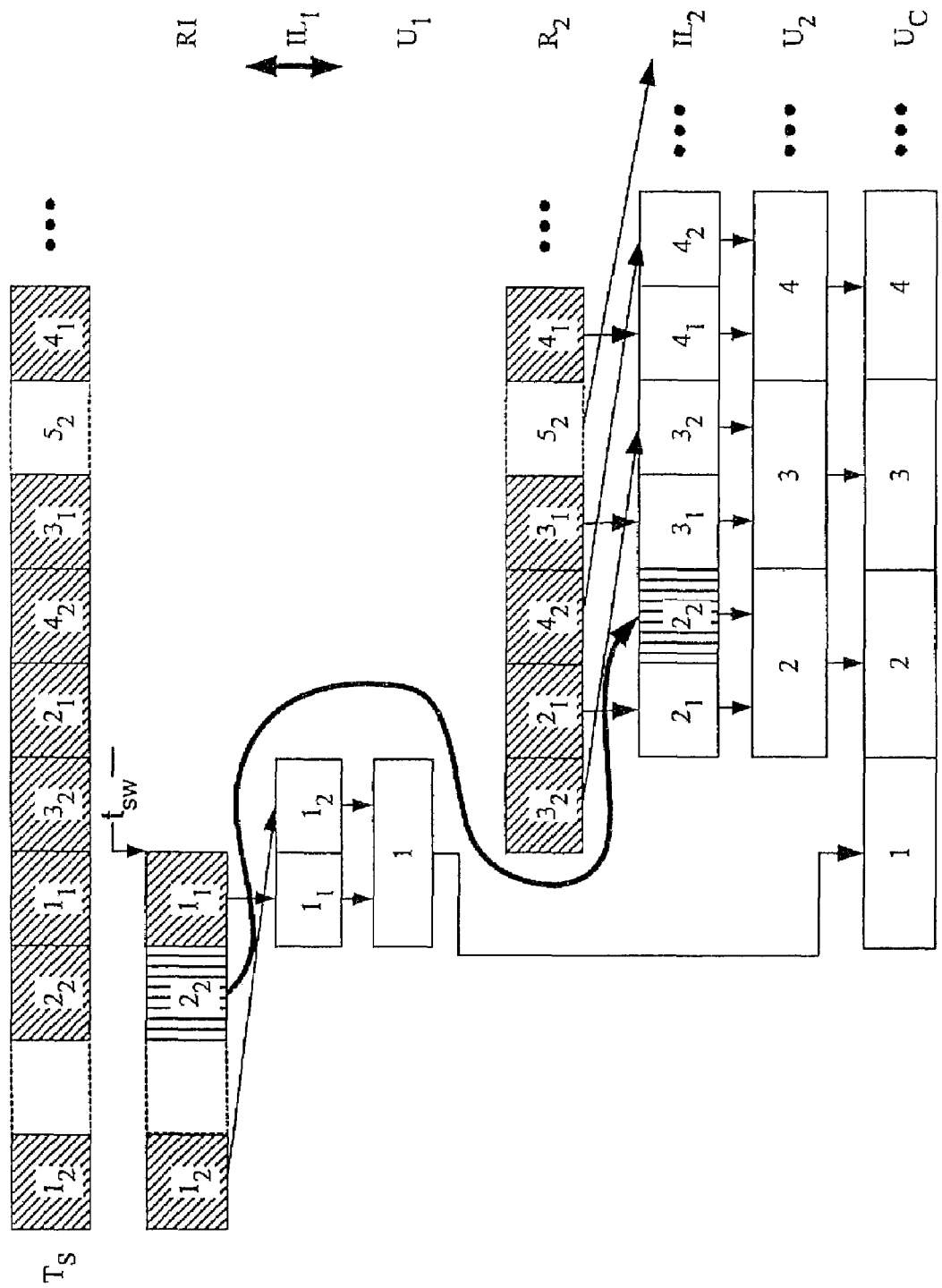
FIG. 4 UPLINK (switch)

FIG. 5   DOWNLINK (switch)
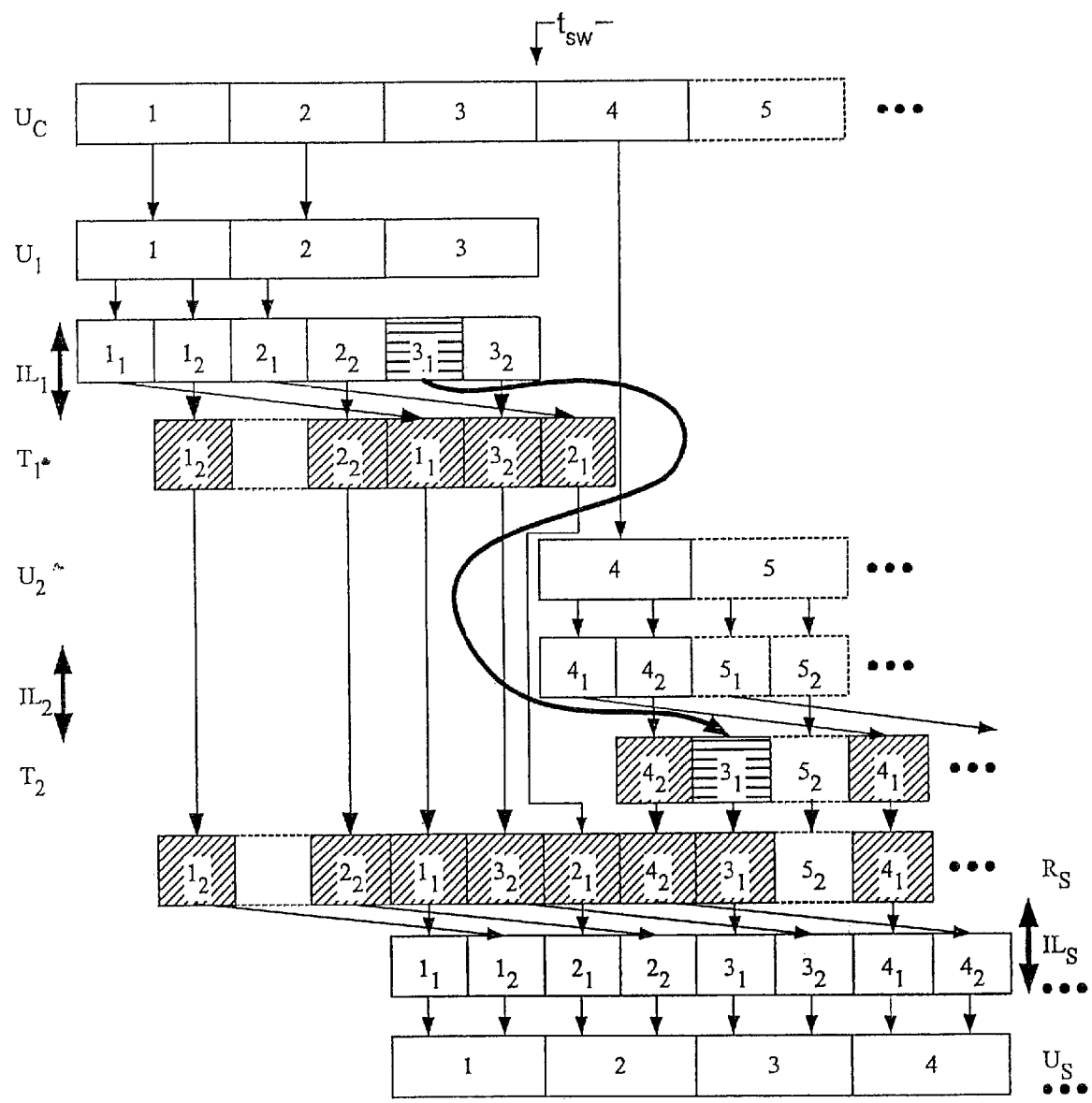

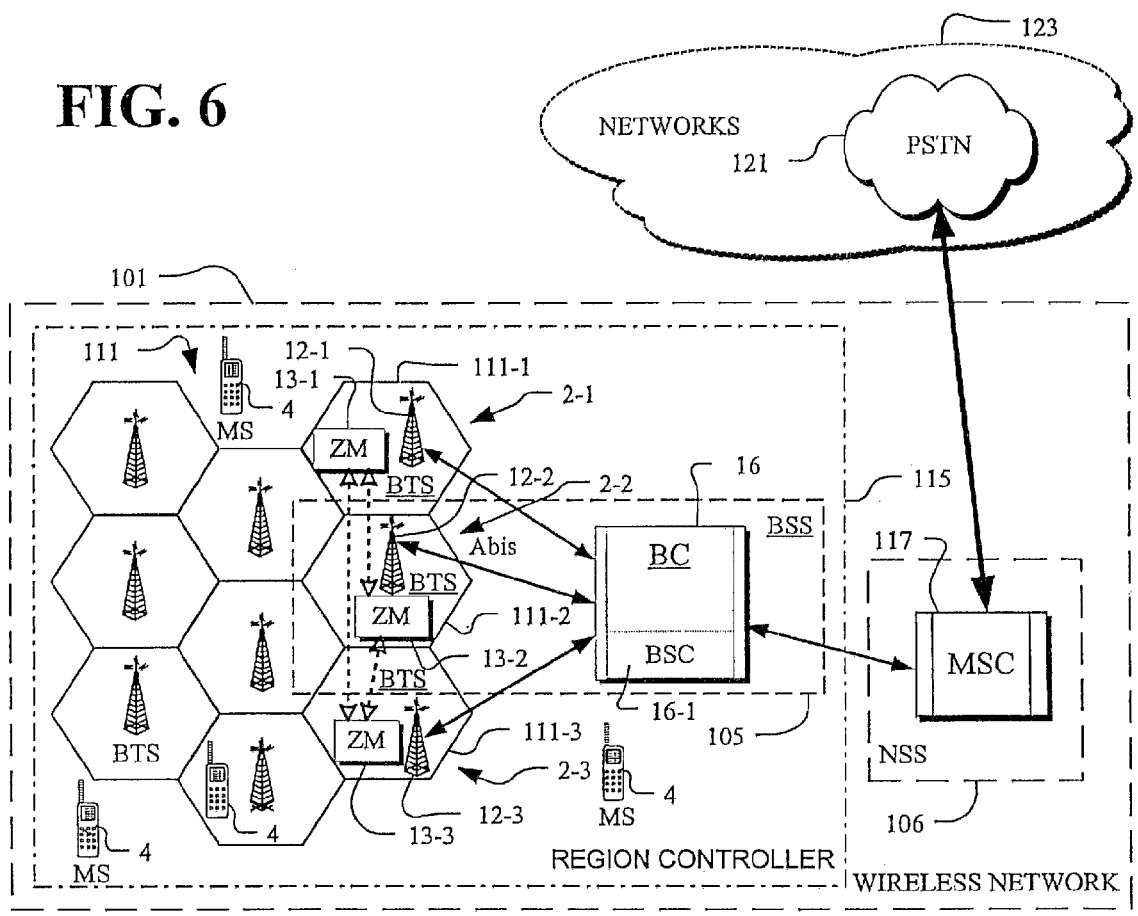
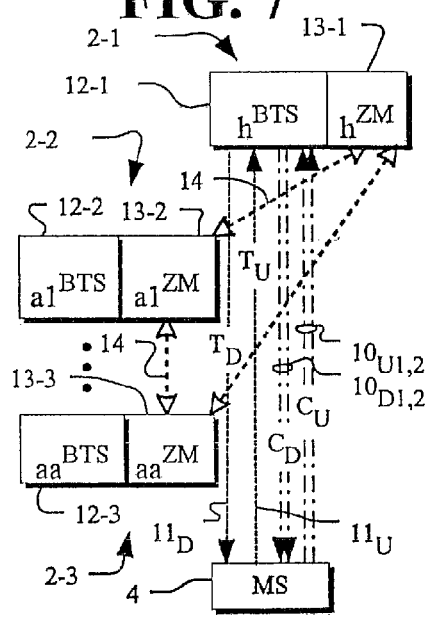
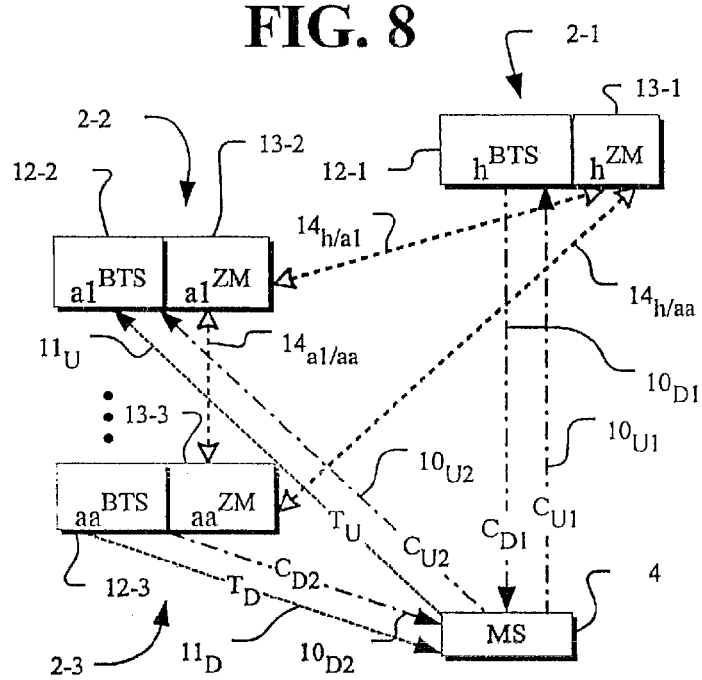

FIG. 14

FAST MACRODIVERSITY SWITCHING IN MOBILE WIRELESS NETWORKS

CROSS REFERENCE

This is a Continuation Patent Application of U.S. patent application Ser. No. 09/836,752,filed Apr. 17, 2001, now U.S. Pat. No. 7,212,515 which is a Continuation-in-part of U.S. patent application Ser. No. 09/750,592,filed Dec. 28, 2000 now U.S. Pat. No. 7,433,683.

BACKGROUND OF THE INVENTION

The present invention relates to the field of mobile wireless communication systems and more specifically to methods and apparatus for communication with mobile telephone users (cellular and personal communication systems), mobile wireless data communications, two-way paging and other mobile wireless systems.

In a mobile wireless network, mobile stations (MS) are typically in communications with one base transceiver station (BTS) through up and down radio links. Such ground-based radio links suffer from strong local variations in path loss mainly due to obstructions and line-of-sight attenuation. As MS move from one point to another, their signal path losses go through shadow fading fluctuations that are determined, among other things, by the physical dimension of the obstructions, antenna heights and MS velocity. These variations in path loss, must be taken into account in the design of the up-link and down-link radio link resource allocation.

While communicating with a specific host BTS, MS are frequently within the communications range of other BTS. Statistically, due to the distribution of physical obstructions, the shadow fading path loss fluctuations to such other BTS tend to be only weakly correlated with the path loss fluctuations on the link between the MS to host BTS link. It is therefore possible that a MS, at anyone time and location, has a lower path loss to a different BTS than the one it is communicating with.

In a conventional wireless network using the GSM standard, the base station controller (BSC) manages the radio link resources of the BTS. These resources are determined by the number of transceivers installed at the BTS and the number of radio channels anyone transceiver can handle. For example, in TDMA standards, a radio channel consists of a frequency and a time slot. In CDMA standards, a radio channel is represented by a frequency and one of a number of orthogonal spreading codes.

A BTS has two principal functions, that of controlling the radio links with all MSs within its cell, and relaying traffic between the BSC and the MSs. Relaying traffic includes receiving down-link traffic from the BSC and broadcasting it to MSs using broadcasters and that of receiving up-link traffic from the MSs using radio receivers called collectors and relaying it to the BSC.

In a mobile wireless network with a BSC, the BSC controls the assignment of the radio link resources (including Broadcasters and Collectors) in the BTSs as well as the operation of the network, and, through the MSC, provides an interface with the Public Switched Telephone Network (PSTN). For generality, the BTS broadcasting and collecting functions can be considered as separate entities. In most existing networks, however, broadcasters (B) and collectors (C) are co-located.

In one example, three base transceiver stations (BTS) include three broadcasters and three collectors where broadcasters and collectors are typically but not necessarily co-located. The broadcasters and collectors have down-links and up-links to the BSC. These links are typically cabled links such as T1/E1 lines. The connection of these links between the broadcasters or collectors with the BSC maybe arranged in various configurations such as a star pattern, a daisy-chain pattern or in any combination of these or other patterns.

When a connection is setup between a MS and the mobile network, a BSC selects the BTS that has the best radio access to the MS. This setup process includes a series of signal transmissions back and forth between the BSC, the BTSs, and the MSs using up-link and down-link radio control channels. The setup process results in the assignment of dedicated radio traffic and control channels for the up-links and down-links for communications between the MSs and the BTSs. Once these connections are set-up, user traffic, also called payload, can be transmitted between the MSs and the BSC. While the connection lasts, the BTS/BSC controls the operation of the radio traffic channels, including power control, frequency hopping, and timing advance. Also, the BTS/BSC continues to use the radio broadcast channels for operation, maintenance and signaling with all other MSs in its cell.

Users (MSs) communicate with collectors via control up-links and traffic up-links and with broadcasters via control down-links and traffic down-links. A particular broadcaster and collector is called the host broadcaster and the host collector for a particular MS. Together, they perform the function of the host BTS for the particular MS.

As MSs move within a cell and as the average path loss between an MS and its serving broadcaster and collector degrades, existing networks reassign the MS to another BTS (with a broadcaster and collector) that has a lower path loss. This process is called handover or handoff. Prior systems distinguish between hard and soft handover. During hard handover, both the control and traffic radio links between the MS and BTS are terminated and new radio links are set-up between the MS and the new BTS using the radio resources assigned to the new BTS. In case of a handoff failure, the MS and BTS reestablish the control and traffic radio link as it existed before the handoff was attempted. This hard handover is used in GSM networks. In CDMA networks, hard and soft handoff is practiced. In soft handoff, the new radio links are setup before the old links are terminated (make before break operation). CDMA allows simultaneous communications of a MS with a number of BTS during soft handoff.

One technique for maintaining low transmit power during the operation of a mobile radio link is dynamic power control. It may be applied on both the up-link and down-link directions or only in one direction, and it may be performed in an open-loop or closed-loop mode. In open-loop power control mode, the transmit power is determined by system level parameters. In closed-loop power control mode, the power is dynamically set in response to radio link measurements such as distance measurements between the MS and the BTS (as determined by time of arrival measurements), receive signal strength measurements, or error rate measurements.

Another known method to improve network performance is the use of macrodiversity signal combining (also called aggregation). This method uses multiple spaced-apart transmitter/broadcasters and collector/receivers in the BTSs to simultaneously communicate with a MS. The soft handoff practiced in CDMA is such an example. On the down-link, the signal is transmitted from multiple spaced-apart broadcasters using down-link traffic channels. These multiple signals are received by the MS (for example using a rake receiver in CDMA), and combined, to provide a processed signal with a higher level of confidence. On the up-link, multiple spaced-apart receivers/collectors receive the signal transmitted by the MS on up-link traffic channels. These multiple receive signals are then transported to a central location and processed to provide a processed signal with a higher confidence level then any of the individual signals would provide. One disadvantage of macrodiversity combining, when used on the up-link, is the added backhaul associated with transporting the receive signals from multiple collectors to one central location.

In GSM systems, Channel Coding occurs for the Channels using a number of techniques including Block Coding, Data Reordering, Convolutional Coding, Repacking and Interleaving. Interleaving is employed, for example, in the Traffic Channel for Full-rate Speech (TCH/FS), the Fast Associated Control Channel for Full-rate Speech traffic (FACCH/FS) and the Slow Associated Control Channel for Full-rate Speech traffic (SACCH/FS).

For TCH/FS and FACCf/FS, the processing prior to interleaving produces an output block of 456 channel coded bits. To guard against burst errors during transmission, half of the bits within this block of coded bits are interleaved with half of the bits from the previous block of coded bits. The remaining bits are then interleaved with half of the bits from the next block of coded bits. The interleaving process results in the 456 coded bits being spread out over 8 bursts of 114 bits in sub-bursts of 57 bits each. The interleaving algorithm is given by the following two equations, Eqs (1), which define where each of the 456 channel coded bits is placed within the 8 bursts of 114 interleaved bits.

$$\text{Burst\#} = k \bmod 8 \text{ range } \{0,1,2,\ldots 7\} \text{ Bit \#} = 2[(49 k) \bmod 57] + [(k \bmod 8) \text{ div } 4] \text{ range } \{0,1,2,\ldots 114\} \quad \text{Eqs (1)}$$

where:

$k$=bit number of the 456 channel coded bits range $\{0,1,\ldots,455\}$

The major result of the two interleaving equations is that each of the eight blocks will contain either 57 even channel coded bits or 57 odd channel coded bits from a particular speech block of 456 bits.

Interleaving for SACCH/FS is used to help alleviate the effects of error bursts during transmission. The 456 channel coded bits (228 even bits and 228 odd bits) are interleaved with an algorithm which is similar to the algorithm applied to the traffic channels with one significant difference. The traffic channel data is interleaved with adjacent frames of data where a 456 bit traffic frame was interleaved with both the preceding traffic frame and the following traffic frame. For the SACCH/FS, the 456 channel coded bits are interleaved among themselves. The interleaving process results in the 456 coded bits being spread out over 4 bursts of 114 bits.

The interleaving algorithm is given by the following two equations, Eqs. (2), which define where each of the 456 channel coded bits is placed within the 4 blocks of 114 interleaved bits.

$$\text{Burst\#} = k \bmod 4 \text{ range } \{0,1,2,3\} \text{ Bit \#} = 2[(49 k) \bmod 57] = [(k \bmod 8) \text{ div } 4] \text{ range } \{0,1,2,\ldots 114\} \quad \text{Eqs (2)}$$

where $k$=bit number of the 456 channel coded bits range $\{0,1,2,\ldots,455\}$

The major result of the two interleaving equations, Eqs (2), is each of the four bursts will contain either 114 even channel coded bits or 114 odd channel coded bits.

Although interleaving is useful for providing some immunity to interfering signal bursts or other channel conditions over interleave periods that are longer than such bursts, such interleaving hampers other processing that has fast operations for improving performance. Fast processing that operates to make changes within times that are shorter than the interleave operation period are hampered because the data at such times in an interleaved order different from the normal order.

In wireless networks, dedicated radio links serve individual MSs and are at times operated at lower power levels. For instance, MSs close to a BTS do not require large transmit power levels and are operated at the minimum level meeting the link quality requirements. The reason for reducing power is to conserve radio band resources to enable reuse of radio resources in as many cells in the network as possible. MSs sharing up-link radio resources generate co-channel interference at their respective BTSs BTSs sharing down-link radio resources generate co-channel interference at MSs.

Shadow fading imposes large fluctuations on the path loss between a particular MS moving in a cell and its serving BTS. At times when the path loss to a BTS is high, a high transmit power is used to maintain the quality of service. At such times, it is likely that the path loss between the particular MS and another BTS is lower because shadow fading effects between a MS and different BTSs are not highly correlated. Therefore, such other BTS can communicate traffic and/or control signals with the particular MS using lower up-link and down-link power levels. By switching the traffic and/or control channel over to such other BTS, the contribution of the particular radio link to the interference level in the network for other MS-BTS links that use the same radio resources is reduced. When such switching is implemented for many radio links in a network, a larger number of links can be operated in the network increasing network capacity without adding radio bandwidth.

The above-identified, cross-referenced application entitled SYSTEM FOR FAST MACRODIVERSITY SWITCHING IN MOBILE WIRELESS NETWORKS takes advantage of the de-correlation of shadow fading effects using fast macrodiversity switching (FMS) to select a BTS with the lowest instantaneous path loss for communicating up-link and down-link channels to a particular MS. In operation, host and assistant BTSs are employed. The host BTS remains in control of the particular MS via its broadcast channel until a handover is carried out. The dedicated channels with the particular MS are routed originally through the host BTS. When another BTS with a lower path loss becomes available, traffic and control channels are routed through such other BTS, which is designated as the assistant BTS for particular channels. As an MS moves through the cell, and as its path and shadow-fading losses change, the dedicated channels are switched among a number of BTSs inter network, including the host BTS. This fast macrodiversity switching continues unless the path loss between the particular MS and the host BTS becomes too high and a handover of the broadcast and dedicated channels is executed.

In the fast macrodiversity switching (FMS) process described, the radio resource used for a broadcast channel (frequency, time slot, code) for the host BTS is not changed while the dedicated channels are switched. The FMS process therefore differs from the handover process. Specifically, in the handover process, both the broadcast and dedicated channels are switched from radio resources assigned to the old BTS to radio resources assigned to the new BTS in accordance with a frequency reuse plan. By way of contrast in the FMS process, the broadcast channel is not switched while the dedicated channels are switched. The time scale of the FMS switching process is fast relative to switching for a handover. Fast macrodiversity switching operates, for example, at switching speeds less than one second and in the range of 0.02 seconds to 0.25 seconds in a GSM embodiment. The FMS process can be done without modification to standard MS operation and also without signaling to a MS.

In an FMS environment where interleaving is present, the combination of interleaving and fast macrodiversity switching causes portions of interleaved data to be split and directed to different locations, that is, to different host or assistant BTSs. When interleaved data is split so as to reside at different locations, the interleaved process is disturbed and will not operate, if at all, in the normal manner.

Accordingly, there is a need for improved processing that permits fast macrodiversity switching in an environment of interleaving that helps achieve the objectives of improved performance and higher density of MSs.

SUMMARY

The present invention is a method and apparatus for fast macrodiversity switching (FMS) of channels that employ interleaving. The fast macrodiversity switching dynamically switches radio links used for traffic and control channels for a mobile station among a number of base transceiver stations (BTS) without switching the radio resource, that is for example, using the same frequency and time slot combination (TDMA).

The fast macrodiversity switching of channels is under control of zone managers and the interleave processing is under control of an interleave manager which, in one embodiment, is distributed among zone managers. Each transceiver station and its channels includes or is otherwise associated with a zone manager where a host transceiver station has its zone manager designated as a host zone manager and other transceiver stations (assistant BTSs) have their zone managers designated as assistant zone managers. The up-link and down-link signals have segments that include split segments, each having different component segments.

The control by the host and assistant zone managers includes switching down-link signals to and up-link signals from mobile stations among base transceiver stations which include broadcast channels (non-switched) and dedicated (switched) channels that employ interleaving. Zone managers determine preferred ones of the transceiver stations for particular dedicated channels for a particular mobile station. Preferred ones of the transceiver stations are dynamically selected to provide the dedicated channels for the mobile stations separately from the transceiver stations providing broadcast channels for the mobile stations. The dedicated channels are switched as frequently as a signal switch time which can be the frame rate of the up-link signals. The switch time is typically less than 1 second for mobile stations in a GSM system. The switching causes ones of the component segments of the split segments to be at different locations. A split segment processor controls the component segments to enable the processing of the split segments, particularly when the component segments for a split segment are at different BTS or other locations in the system. In certain embodiments, the split segment processor controls the assembly of the component segments at a common location to enable the processing of the split segments at that common location.

The interleave manager and interleave processing for controlling split segments needed to enable interleave processing is implemented in a number of embodiments. For a GSM wireless system, the embodiments include TCH/FS Processing, FACCH/FS Processing and SACCH/FS Processing.

For TCH/FS Processing, the embodiments include,
For Uplink TCH/FS,
    Forward Partial TRAU (Transcoder Rate Adapter Unit) Data to the Old/New Site,
    Overlapped Resource Allocation, Drop a Block.
For Downlink TCH/FS,
    Forward Untransmitted TCH Data to the New Site,
    Forward TRAU Data to the New Site,
    Drop a Block
    For FACCH/FS Processing, the embodiments include,
For Uplink FACCH/FS,
    No Site Switching During FACCH/FS Transfer,
    Forward Partial FACCH/FS Data to the Old/new Site,
    Overlapped Resource Allocation,
For Downlink FACCH/FS,
    No Site Switching During FACCH/FS Transfer,
    Forward Untransmitted FACCH/FS Data to the New Site,
    Forward Layer 2 Data to the New Site.
For SACCH/FS Processing, the embodiments include,
For Uplink SACCH/FS,
    No Macrodiversity In SACCH/FS,
    Always Send Soft Bits to $_h$ZM and $_h$ZM/$_h$BTS Does Channel Decoding,
    Switch Of Soft Bits Only On Uplink Switching, Last $_s$BTS Decodes the SACCH/FS Block
    Dynamic Decoding Implementation,
    $_s$BTS Which Receives the First SACCH/FS Frame (SACCH/FSO) Will Continue Receiving Rest of the SACCH/FS Block,
For Downlink SACCH/FS,
    No Macrodiversity in SACCH/FS,
    $_s$BTS Always Receives the SACCH/FS Message from $_h$ZM, $_s$ BTS Does Channel Coding,
    $_h$ZM Does the Channel Coding, $_s$BTS Always Receives the Channel-encoded Bits,
    Each $_c$BTSs Configured to Send System Information and $_h$ ZM Sends Power Level and Timing Advance Value to the $_s$BTS.

The foregoing and other objects, features and advantages of the invention will be apparent from the following detailed description in conjunction with the drawings.

BRIEF DESCRIPTION OF THE DRAWINGS

FIG. 2 depicts further details of the wireless channel devices of FIG. 1.

FIG. 3 depicts the interleaved uplink communications from a wireless station to one wireless channel devices.

FIG. 4 depicts the interleaved uplink communications from a wireless station to a first wireless channel device and then after a switch time is switched to a second wireless channel device.

FIG. 5 depicts the interleaved downlink communications initially from a first wireless channel device and then after a switch time from a second wireless channel device to a wireless station.

FIG. 6 depicts a wireless network formed of multiple base transceiver stations (BTSs) and multiple associated zone managers (ZMs) using the interleaved communications as described in connection with FIG. 1 through FIG. 5.

FIG. 7 depicts a wireless network formed of multiple base transceiver stations (BTSs) and multiple zone managers (ZMs) where traffic and control communications are between a host BTS and an MS under control of a host zone manager and assistant zone managers for other BTS using the interleaved communications as described in connection with FIG. 1 through FIG. 5.

FIG. 8 depicts a wireless network formed of multiple base transceiver stations (BTSs) and multiple zone managers (ZMs) where control and traffic communications have been switched among host and assistant BTS under control of a host zone manager and assistant zone managers using the interleaved communications as described in connection with FIG. 1 through FIG. 5.

FIG. 14 depicts a representation of signal timing for SACCH/FS interleaving operations in a GSM system.

DETAILED DESCRIPTION

Figure 1:
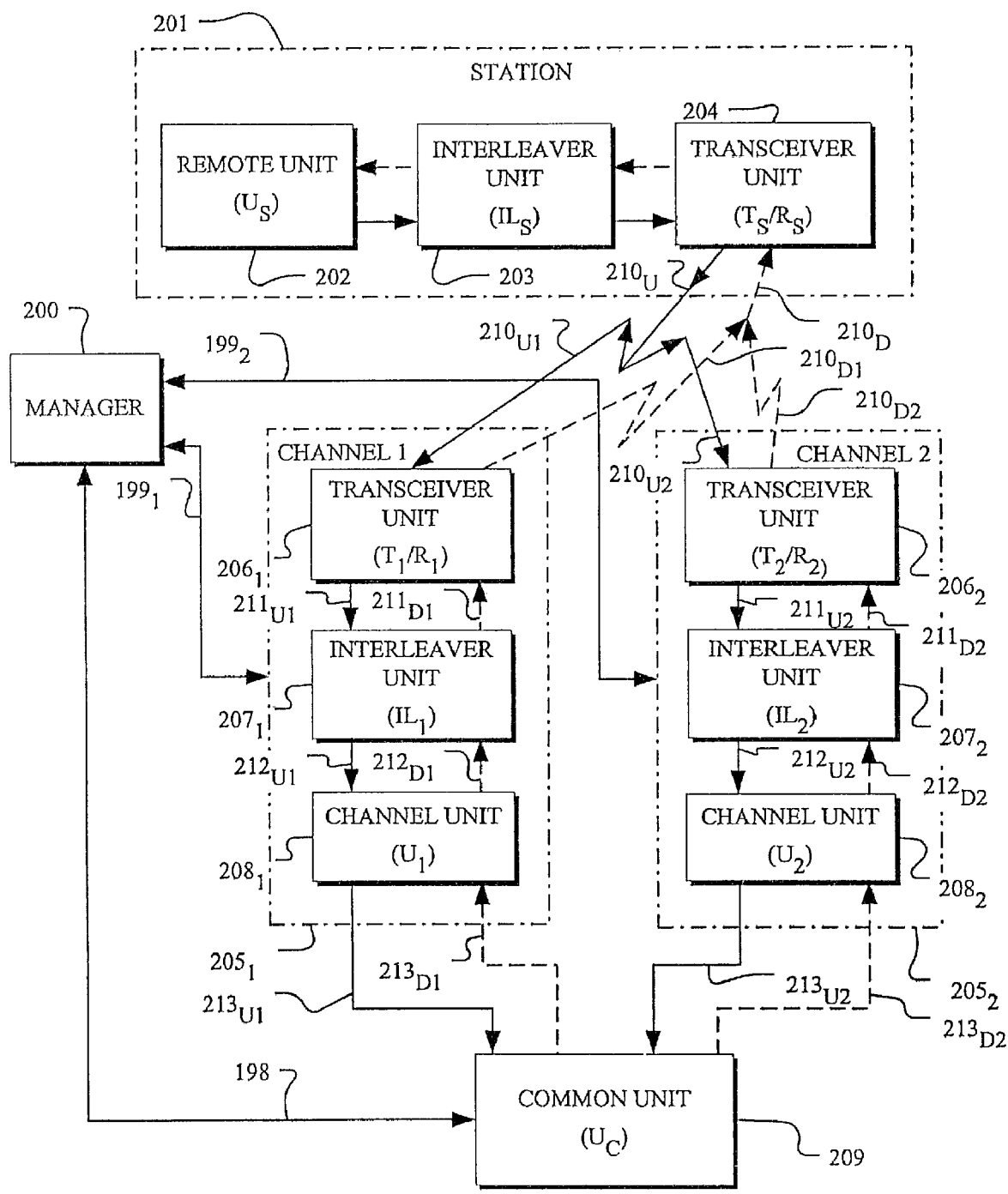
FIG. 1 depicts a wireless station in communication with one or more wireless channel devices.

In FIG. 1, a wireless station 201, for example a mobile station (MS), is in wireless communication with one or more wireless channel devices 205, including devices $205_1$ and $205_2$, for example BTSs in a GSM wireless system. The wireless station 201 includes a remote unit ($U_s$) 202 which sends and receives digitized communications (voice or data) with bits in a normal order to or from interleaver unit ($IL_s$) 203. Interleaver unit 203 functions to change the order between a normal order and an interleaved order in accordance with an interleaving algorithm. For example, a communication from unit 202 having a communication with normally ordered segments 1,2,3,4,5,6 may change the order of segments to an interleaved order 1,3,2,4,6,5. The term "segment" means any orderable communication unit such as a bit, byte, block or burst. As a further example, segments 1,2,3,4 may be composed of smaller component segments, where, for example, segment 1 is formed of component segments $1_1, 1_2$ so that in an analogous manner segments 1,2,3,4 are formed of segments $1_1, 1_2; 2_1, 2_2; 3_1, 3_2; 4_1, 4_2$. The interleaver unit 203 functions to reordered the normal order $1_1, 1_2; 2_1, 2_2; 3_1, 3_2; 4_1, 4_2$ on a component segment basis as the interleaved order $1_2,-; 2_2, 1_1; 3_2, 2_1; 4_2, 3_1;-, 4_1$. The reordered segments from the interleaver unit 203 are connected for transmission to the transceiver unit 204 which transmits the communication in the station transmitter ($T_s$) in the interleaved order, in the example given, $1_2,-; 2_2, 1_1; 3_2, 2_1; 4_2, 3_1;-, 4_1$ on the up link channel $210_U$.

The station 201 also operates in the receive direction in which down link communications are received on the downlink $210_D$. If, for example, a downlink communication in interleaved order such as $1_2,-; 2_2, 1_1; 3_2, 2_1; 4_2, 3_1;-, 4_1$ is received on downlink $210_D$ by the receiver portion $R_S$ of transceiver 204, the received communication with interleaved order $1_2,-; 2_2, 1_1; 3_2, 2_1; 4_2, 3_1;-, 4_1$ is connected to interleaver 203 and is reordered to the normal order $1_1, 1_2; 2_1, 2_2; 3_1, 3_2; 4_1, 4_2$ for use by the station 202. The downlink $210_D$ is formed by the union of the downlink $210_{D1}$ from the transmitter $T_1$, of transceiver $206_1$, and the downlink $210_{D2}$ from the transmitter $T_2$ of transceiver $206_2$.

In FIG. 1, the wireless station 201 is in wireless communication with the wireless channel devices $205_1$, and $205_2$. The devices $205_1$ and $205_2$ include transceivers $206_1$ and $206_2$, respectively, interleavers $207_1$, and $207_2$, respectively, and channel units $208_1$ and $208_2$, respectively. Without switching between the devices $205_1$ and $205_2$, an uplink communication $210_U$ from transceiver 204 is broadcast as $210_{U1}$ to the receiver ($R_1$) of transceiver $206_1$ in the channel 1 device $205_1$. The interleaved communication $1_2,-; 2_2, 1_1; 3_2, 2_1; 4_2, 3_1;-, 4_1$ is connected via connection $211_{U1}$ to the interleaver ($IL_1$) $207_1$, which operates to reorder the communication to the normal order $1_1, 1_2; 2_1, 2_2; 3_1, 3_2; 4_1, 4_2$ for use by the channel unit $208_1$, and connection on $213_{U1}$, to the common unit ($U_C$) 209.

Without switching between the devices $205_1$, and $205_2$, alternatively, an uplink communication $210_U$ from transceiver 204 is broadcast as $210_{U2}$ to the receiver ($R_2$) of transceiver $206_2$ in the channel 2 device $205_2$. The interleaved communication $1_2,-; 2_2, 1_1; 3_2, 2_1; 4_2, 3_1;-, 4_1$ is connected via connection $211_{U2}$ to the interleaver ($IL_2$) $207_2$ which operates to reorder the communication to the normal order $1_1, 1_2; 2_1, 2_2; 3_1, 3_2; 4_1, 4_2$ for use by the channel unit $208_2$ and connection on $213_{U2}$ to the common unit ($U_C$) 209.

In FIG. 1, the manager 201 controls the channel 1 device $205_1$, and the channel 2 device $205_2$ to determine which of those devices is active to communicate with the station 201 at any particular instances in time. Where fast macrodiversity switching occurs between device $205_1$ and device $205_2$, manager 201 signals a switch time, $t_{SW}$, after which as witch is made from one to the other of the channel devices $205_1$, and $205_2$.

In FIG. 2, channel device 205, typical of the channel devices $205_1$, and $205_2$ of FIG. 1, is shown formed of conventional GSM system components for communications using PCM (Pulse Code Modulation) data operating at 64 kbit/sec, an Abis interface operating at 16 kbit/sec and the Um air interface.

Particularly, in the down-link direction, the speech encoder and TRAU (Transcoder Rate Adapter Unit) framer unit 214-2 operates to encode speech and adapt the rate from the 64 kbit/sec PCM coded data to the 16 kbit/sec Abis data rate. The channel coder 213-2 introduces redundancy and increases the data rate by adding information calculated from the source data to facilitate the detection and correction of signal errors introduced during transmission. The interleaver 207-2 interleaves bits of several code words in order to spread out bits which are close to one another in the modulated signal over several code words. The interleave takes advantage of the property that the error probability of successive bits in the modulated stream is highly correlated and interleaving functions to de-correlate errors by de-correlating bit positions in code words. The block-to-burst formatter 212-2 formats bursts. Burst formatting adds some binary information in order to help synchronisation and equalization of the received signals The cipherer 211-2 modifies blocks with a code known by the mobile station and the BTS. The output of the cipherer consists of binary information blocks. The modulator 210-2 transforms the binary signal into an analog signal at the right frequency and at the right moment according to the multiple access rules and this signal is radiated as radio waves.

In the up-link direction, the reverse operations are performed. Radio waves are captured by the antenna and the portion of the received signal which is of interest to the receiver is determined by the multiple access rules. The demodulator 210-1 forms a succession of binary information blocks that may include confidence metrics that are an estimated probability of correctness for each bit received and such confidence metrics are used in "soft decision" processing. The decipherer 211-1 modifies those bits by reversing the ciphering, typically a bit-by-bit Exclusive-Or with a ciphering sequence that can be used with soft decision processing. The de-interleave 207-1 puts the bits of the different bursts back in normal order to rebuild the code words. The channel decoder 213-1 reconstructs the source information from the code words. The speech decoder and TRAU (Transcoder Rate Adapter Unit) deframer unit 214-1 operates to decode speech and adapt the 16 kbit/sec Abis data rate to the 64 kbit/sec PCM data rate.

In FIG. 3, the operation of the FIG. 1 system is shown with interleaved uplink communications from wireless station 201 to wireless channel device $205_1$. The segments 1,2,3,4 in station ($U_S$) 202 are composed of segments $1_1, 1_2; 2_1, 2_2; 3_1, 3_2; 4_1, 4_2$. The interleave ($IL_S$) 203 functions to reorder those segments with an interleave algorithm to $1_2,-; 2_2, 1_1; 3_2, 2_1; 4_2, 3_1;-, 4_1$ and transmits the interleaved sequence using the transmitter ($T_S$) of transceiver 204 in the interleaved order on the uplink channel $210_U$. The interleaved communication $1_2,-; 2_2, 1_1; 3_2, 2_1; 4_2, 3_1;-, 4_1$ is received by the receiver ($R_1$) of the transceiver $206_1$ and is connected, via connection $211_{U1}$, to the interleave ($IL_1$) $207_1$, which operates to reorder the communication to the non-interleaved sequence $1_1, 1_2; 2_1, 2_2; 3_1, 3_2; 4_1, 4_2$ for use by the channel unit ($U_1$) $208_1$, and, via connection on $213_{U1}$, to the common unit ($U_C$) 209 as the sequence 1,2,3,4.

In FIG. 4, the interleaved uplink communications from the wireless station 201 starts out as shown in FIG. 3 for the transmission of the interleaved communication $1_2,-; 2_2, 1_1; 3_2, 2_1; 4_2, 3_1; -, 4_1$ from the transmitter ($T_S$) of the transceiver 204. Initially, the first part of that communication, communication $1_2,-; 2_2, 1_1$ is received by the receiver ($R_1$) of the transceiver $206_1$ of the channel 1 device $205_1$ and then after a switch time, $t_{SW}$, the manager 200 causes the reception to be switched to the receiver ($R_2$) of the transceiver $206_2$ of the channel 2 device $205_2$ which receives the balance of the interleaved communication, $3_2, 2_1; 4_2, 3_1; 5_2, 4_1$. In such operation, the segments $2_1$ and $2_2$ are "split" segments since they are present only in different channel devices and hence, for channel coder operations that require both parts of the segment to be present, further interleave processing is required to enable them to be combined. For example, the further processing operates such that the split segment $2_2$ in receiver $R_1$ of channel device $205_1$ is transferred to interleave $IL_2$ of channel device $205_2$ to be combined with the split segment $2_1$ already present in channel device $205_2$. The manner of transferring the split segments needed for interleaving is under control of the manager 200 of FIG. 1. In one example, the manager link $199_1$, between manager 200 and channel device $205_1$, and the manager link $199_2$ between manager 200 and channel device $205_2$ are employed to transfer the split segment $2_1$ from device $205_1$, to device $205_2$ so that both segments $2_1$ and $2_2$ are in device $205_2$. Other mechanisms and interleave processing can be employed to accommodate the split segments of uplink interleave operations.

In FIG. 5, the interleaved downlink communication segments $1_2,-; 2_2, 1_1; 3_2, 2_1$, are transmitted to the receiver of wireless station 201 ($R_S$) by the transmitter ($T_1$) of a first wireless channel device $205_1$. After a switch time, $t_{SW}$, communication segments $4_2, 3_1; 5_2, 4_1$ are transmitted from the transmitter ($T_2$) of a second wireless channel device $205_2$ to the receiver ($R_S$) of the wireless station 201. The split segment $3_1$ is not transmitted in either of the above transmissions without further processing by interleave manager 200. In one embodiment, the split segment $3_1$ is transferred by the manager 200 over the network links 199. For example in one embodiment, the manager link $199_1$ between manager 200 and channel device $205_1$, and the manager link $199_2$ between manager 200 and channel device $205_2$ are employed to transfer the split segment $3_1$, not transmitted by transmitter $T_1$, to the transmitter $T_2$ for transmission by $T_2$. Other mechanisms and interleaved processing can be employed to accommodate the split segments of downlink interleave operations.

The interleaved communication segments $1_2,-; 2_2, 1_1; 3_2, 2_1; 4_2, 3_1; 5_2, 4_1$ are received by the receiver ($R_S$) of the transceiver 204 and are connected to the interleave ($IL_S$) 203 which operates to reorder the interleaved segments to the non-interleaved segments $1_1, 1_2; 2_1, 2_2; 3_1, 3_2; 4_1, 4_2$ for use by the station unit ($U_S$) 202 as the normal order segments 1,2,3,4.

FIG. 6 depicts a wireless network 101 formed of multiple base stations (BSs) 2, including BS 2-1,2-2 and 2-3, and multiple associated zone managers (ZMs) 13, including zone managers 13-1,13-2 and 13-3,using the interleaved communications as described in connection with FIG. 1 through FIG. 5. In FIG. 6, the mobile wireless network 101 includes the base transceiver stations (BTS) 12, including the BTS 12-1, 12-2 and 12-3 as part of the base stations 2-1, 2-2 and 2-3, respectively, that have radio down-links and radio up-links to a base controller 16. These links are typically cabled links such as T1/E1 lines. The base controller 16 includes a base station controller (BSC) 16-1. The BSC 16-1 controls the assignment of the radio link resources and the operation of the network and has an interface through the mobile switching center (MSC) 117, with the Public Switched Telephone Network (PSTN) 121 of networks 123.

In FIG. 6, the base controller (BC) 16, including the base station controller (BSC) 16-1 are part of the base station system (BSS) 115. The BSC 16-1 communicates with the base transceiver stations (BTS) 12 within the cells 111 of the wireless network 101. The cells 111-1, 111-2 and 111-3 are shown in expanded detail to include the BTS 12-1, 12-2 and 12-3, respectively, and the associated zone managers (ZM) 13 including ZMs 13-1, 13-2 and 13-3, respectively. The ZMs 13-1, 13-2 and 13-3 are interconnected to form a zone network that controls the macrodiversity switching of the channels among the BTSs 12. The zone network interconnecting the zone managers 13 can be in any form including mesh, daisy-chain, star or otherwise.

In FIG. 6, the MSs 4 are mobile within the cell region 111 and can move, for example, between the cells 111-1, 111-2 and 111-3. As MSs 4 move in the region 111, the ZMs 13 operate to implement the fast macrodiversity switching of the channels. In FIG. 6, the control functions of the BC 16, the BTS 12 and the ZM 13 collectively are part of a region controller 115 which controls the operation of the wireless network 101. In FIG. 6, the MSC 117, part of a network and switching subsystem (NSS) 106, connects to the PSTN 121 within the networks 123.

In the wireless mobile network 111 of FIG. 6, when a connection to a BTS is setup for MS, the BSC selects the BTS that has the best radio access to the MS as host BTS. This setup process includes a series of signal transmissions back and forth between the BSC, the BTSs, and the MS using up-link and down-link radio control channels, and results in the assignment of dedicated radio traffic and control channels for the up-link and down-link between the MS and the BTS. Once this connection is set-up, user traffic is transmitted between the MS and the BSC. While the connection lasts, the BTS/BSC controls the operation of the radio traffic channels, including power control, frequency hopping, and timing advance on dedicated control channels, while it continues to use the radio broadcast channel for operation, maintenance and signaling with all the other MSs in the cell.

In the wireless mobile network 111 of FIG. 6, broadcast channels and dedicated channels are separate. Dedicated channels include control and traffic channels specific to an MS. Broadcast channels are used for signaling and control messages shared by all MSs within the cell, including MSs that are not in use. Broadcast and dedicated channels are carried over radio links. Traffic channels are used to transport user signals also called payload which can be voice or data. To ensure that all MSs within the cell have access to the control signals, the radio link for the broadcast channel is designed to be very reliable by using robust coding and modulation techniques and a high transmit power level.

In the fast macrodiversity switching operation of FIG. 6, it is assumed for purposes of explanation that BTS 12-1 and ZM 13-1 form the host base station (BS) 2-1 for some particular MS. It is also assumed that BS 12-2 and BS 2-3 are assistant BSs available to transmit and receive channels on a radio resource assigned to the host BS 2-1. Since every BS (including a BTS and a ZM) in the network can be both a host BS for some MSs and an assistant BS for other MSs, each such BS has collector and broadcaster resources that can be tuned to any frequency and time slot available in the network.

In one embodiment, additional broadcaster and collector resources are installed in BTSs over what normally are used in the BTSs. These additional resources can be solely dedicated to perform the assistant BS fast macrodiversity switching functions under the control of a zone manager (ZM) 13. In one embodiment, the use of the original radio resources in the BTS are controlled by the BSC. In another embodiment, the original broadcasters and collectors of a BTS and any additionally installed broadcasters and collectors form a common radio resource pool. In this common pool implementation, all resources in the pool may be used to perform the host and the assistant BTS functions. This common pooling implementation makes better use of the available transceiver (broadcaster and collector) resources. Control of this resource pool maybe with the BSC 16-1 for the host BTS function and with the ZMs for the assistant BTS functions, or control of all resources maybe with either the BSC 16-1 or the ZMs 13.

In FIG. 7, the host BTS ($_h$BTS) 12-1 and the corresponding host ZM ($_h$ZM) 13-1 form the host base station ($_h$BS) 2-1 for the particular one MS 4 shown in FIG. 7. The host $_h$BTS 12-1 and the MS 4 in the instance of FIG. 7 operate essentially as a standard GSM system. Communications between the $_h$BTS 12-1 and the MS 4 include the up-link traffic, $T_U$, on link $11_U$ and down-link traffic, $T_D$, on link $11_D$. The control channels include the down-link control, $C_D$, On link $10_{12}$, and the up-link control, $C_U$, on link $10_{U1,2}$. The down-link control channel, $C_D$, has two components, a down-link broadcast control channel on link $10_{D1}$ and a dedicated down-link control channel on link $10_{D2}$. The up-link control channel, $C_U$, has two components, an up-link control channel on link $10_{U1}$ and a dedicated up-link control channel on link $10_{U2}$. Although MS 4 is under control of the host $_h$BTS 12-1, assistant BTSs, including a first assistant $_{a1}$BTS 12-2 and a second assistant $_{aa}$BTS 12-3, associated with the assistant zone managers $_{a1}$ZM 13-2 and $_{aa}$ZM 13-3, respectively, also are available for communications with MS 4. The $_h$ZM zone manager 13-1, $_{a1}$ZM zone manager 13-2 and $_{aa}$ZM zone manager 13-3 are interconnected via links 14 that form an Umbis network. The links 14 of the Umbis network include link $14_{h/a1}$ between the $_h$ZM zone manager 13-1 and the $_{a1}$ZM zone manager 13-2, link $14_{h/aa}$ between the $_h$ZM zone manager 13-1 and the $_{aa}$ZM zone manager 13-3, and the link $14_{a1/aa}$ between the $_{a1}$ZM zone manager 13-2 and the $_{aa}$ZM zone manager 13-3.

In FIG. 8, the $_h$BTS 12-1 and the corresponding, $_h$ZM 13-1 are the host BTS and the host ZM forming the host BS 2-1 for the MS 4. The relationship between the BTS 12-1 and the MS 4 of FIG. 8 is not like that for a standard GSM system. In FIG. 8, the traffic communication is on dedicated channels that have been switched to be between the assistant $_{a1}$BTS 12-2 in the assistant BS 2-2 and the MS 4 for the up-link traffic, $T_U$, on link $11_U$ and has been switched to assistant $_{aa}$BTS 12-3 in the assistant BS 2-2 for the down-link traffic, $T_D$, on link $11_D$. One part of the control channels, the down-link control, $C_{D1}$ on link $10_{D1}$, is a broadcast channel and that broadcast channel remains between host $_h$BTS 12-1 and MS 4. The other part of the control channels, dedicated down-link control, $C_{D2}$, on link $10_{D2}$ and the up-link control, $C_{U2}$, on link $10_{U2}$, are switched to the assistant $_{aa}$BTS 12-3 and $_{a1}$BTS 12-2, respectively. Although MS 4 is under control of the host $_h$BTS 12-1 via the down-link broadcast channel, the assistant BTSs including $_{a1}$BTS 12-2 and $_{aa}$BTS 12-3, associated with the assistant zone managers $_{a1}$ZM 13-2 and $_{aa}$ZM 13-3, directly carry the payload and the dedicated control channels with MS 4. The FIG. 8 embodiment demonstrates the switching of both traffic and control channels in the fast macrodiversity switching process.

In FIG. 8, the links 14 of the Umbis network include link $14_{h/a1}$ between the $_h$ZM zone manager 13-1 and the $_{a1}$ZM zone manager 13-2, link $14_{h/aa}$ between the $_h$ZM zone manager 13-1 and the $_{aa}$ZM zone 13-3, and the link $14_{a1/aa}$ between the $_{a1}$ZM zone manager 13-2 and the $_{aa}$ZM zone manager 13-3. The links 14 form the microdiversity switching network for controlling the fast switching of the dedicated channels among the $_h$BTS 12-1, $_{a1}$BTS 12-2 and $_{aa}$BTS 12-3. Any number of BTSs 12 and ZMs 13 can be included in the channel switching network of FIG. 8.

Figure 9:
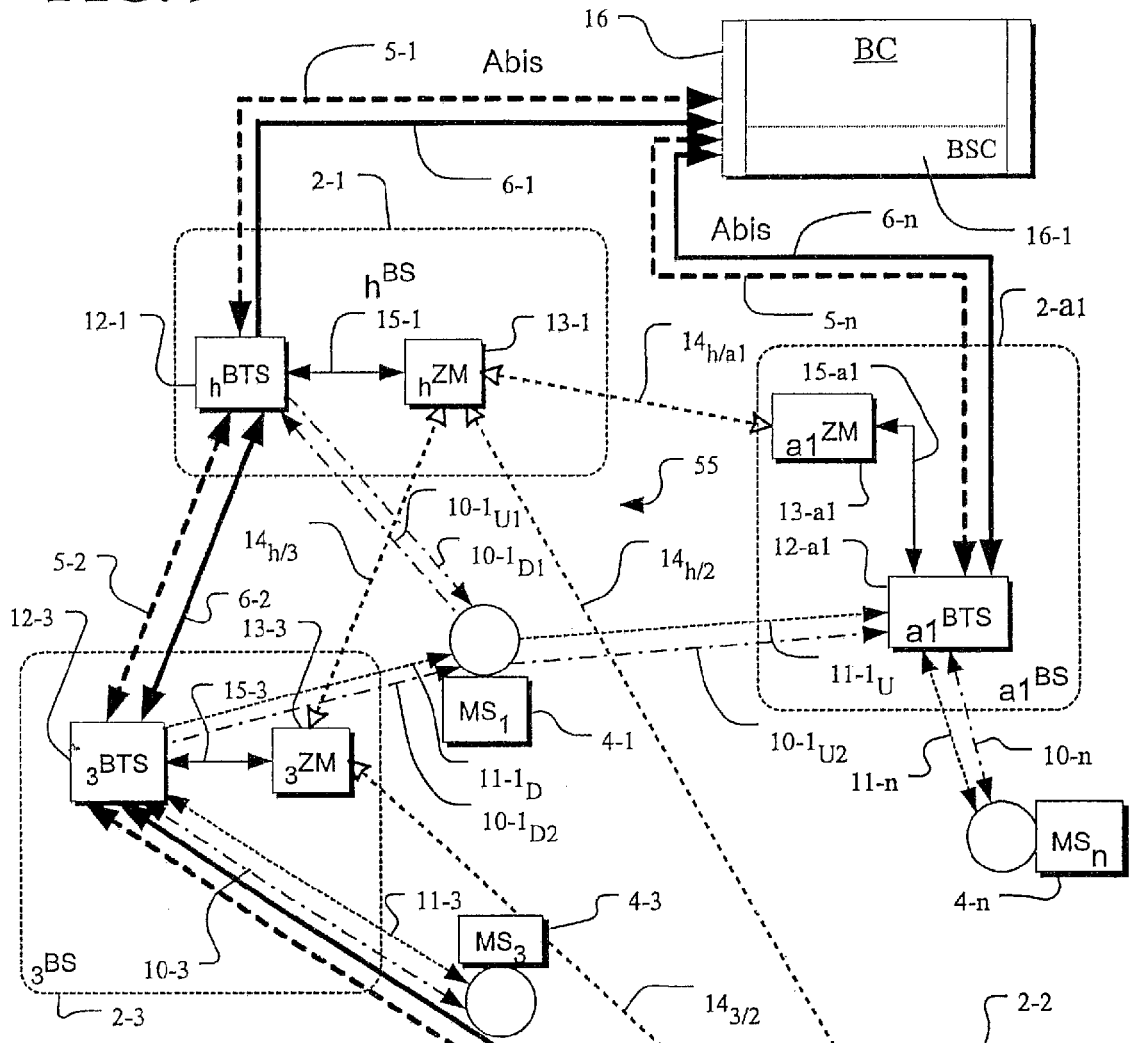
FIG. 9 depicts further details of the host/assistant wireless networks of FIG. 6 through FIG. 8 with host and assistant zone managers.

In FIG. 9, there are n users, MS 4, namely $MS_1$ 4-1, $MS_2$ 4-2, $MS_3$ 4-3, . . . , $MS_n$ 4-n. User $MS_1$ is shown communicating with $_h$BTS 12-1 in the host $_h$BS 2-1 via control link 10-1 including down-link control 10-1$_{D1}$ and a control up-link 10-1$_{U1}$. The user $MS_1$, is communicating with a traffic up-link 11-1$_U$ and a control up-link 10-1$_{U2}$ to assistant $_{a1}$BTS 12-a1 in base station 2-a1 and with a traffic down-link 11-1$_D$ and control down-link 10-1$_{D2}$ to assistant $_3$BTS 12-3 in base station 2-3. The $_h$BTS 12-1 is the host $_3$BTS for $MS_1$. Similarly, user $MS_2$ communicates with $_2$BTS in BS 2-2 via control and traffic links 10-2 and 11-2, respectively. The $_2$BTS 12-2 is the host BTS for $MS_2$. User $MS_3$ 4-3 communicates with $_3$BTS 12-3 in BS 2-3 via control and traffic links 10-3 and 11-3, respectively. The $_3$BTS 12-3 is the host BTS for $MS_3$ and the $_{a1}$BTS and $_3$BTS are assistant BTS for user $MS_1$.

In FIG. 9, the BSC 16-1 in the base controller (BC) 16 communicates over an Abis interface, including the up-link and down-link control signals 5-1 and the up-link and down-link traffic signals 6-1, with the $_h$BTS 12-1 in base station 2-1. Similarly, the BSC 16-1 communicates over an Abis interface, including the up-link and down-link control signals 5-n and the up-link and down-link traffic signals 6-n connected to the $_{a1}$BTS zone manager 13-al in the $_{a1}$BS base station 2-a1.

In FIG. 9, the user $MS_1$ 4-1 communicates with its host $_h$BTS 12-1 which is part of the host base station ($_h$BS) 2-1. Also included in the host base station 2-1 is the zone manager $_h$ZM 13-1 which serves as the host zone manager for the user $MS_1$.

In FIG. 9, the base station $_{a1}$BS base station 2-a1 is an assistant for user $MS_1$, and includes the $_{a1}$ZM zone manager 13-a1 and the assistant $_{a1}$BTS 12-a1. The base station 2-a1 is the host base station for the user $MS_n$ and is an assistant base station for the base station 2-1 that is the host base station for the user $MS_1$, 4-1.

The entities that control the fast macrodiversity switching process are zone managers (ZMs) 13. In the FIG. 9 implementation, one ZM 13 is installed in each cell and is associated with a corresponding BTS 12 for that cell.

In FIG. 9 the zone managers $_h$ZM, $_2$ZM, $_3$ZM, . . . , $_{a1}$ZM form the zone manager network 55 for controlling the fast macrodiversity switching of the dedicated channels. In the embodiment of FIG. 9, zone manager $_h$ZM connects to zone manager $_3$ZM via the link $14_{h/3}$, the zone manager $_h$ZM connects to the zone manager $_2$ZM via the link $14_{h/2}$, the zone manager $_3$ZM connects to the zone manager $_2$ZM via the link $143_{3/2}$ and the zone manager $_h$ZM connects to the zone manager $_{a1}$ZM via the link $14_{h/a1}$. In some embodiments, the zone manager is separate from the BTS as shown in the base stations 2-1, 2-3 and 2-a1 of FIG. 9 with interfaces (Zbis) at 15-1, 15-3 and 15-a1 between the $_h$BTS and the $_h$ZM, between the $_3$BTS and the $_3$ZM and between the $_{a1}$BTS and the $_{a1}$ZM, respectively. In other embodiments, the ZM is in the Abis interface connection as shown in the $_2$BS base station 2-2. In still other embodiments, the ZM is fully integrated with the BTS. The particular implementation selected for the ZM is a matter of design choice.

In FIG. 9, broadcasters and collectors are included as a common entity in each BTS 12. In some wireless networks broadcasters and collectors for the same BTS are separated by macro-diverse distances and are therefore considered separately. The usual configuration where the up-link and down-link path losses typically are highly correlated has broadcasters and collectors co-located at the BTS.

FIG. 9 represents a snap shot of an fast macrodiversity switching implementation for one particular period of time analogous to the configuration of FIG. 8. Any of the MS, for example $MS_2$ or $MS_3$ can also communicate with different BTS on their dedicated channels at anytime. The FIG. 9 embodiment has distributed zone managers. In another embodiment, the zone manager function can be centralized and located, for example, in the BSC 16-1. As shown in FIG. 9, the zone manager may be integrated or connected with the BTS, or located on the Abis link.

Figure 10:
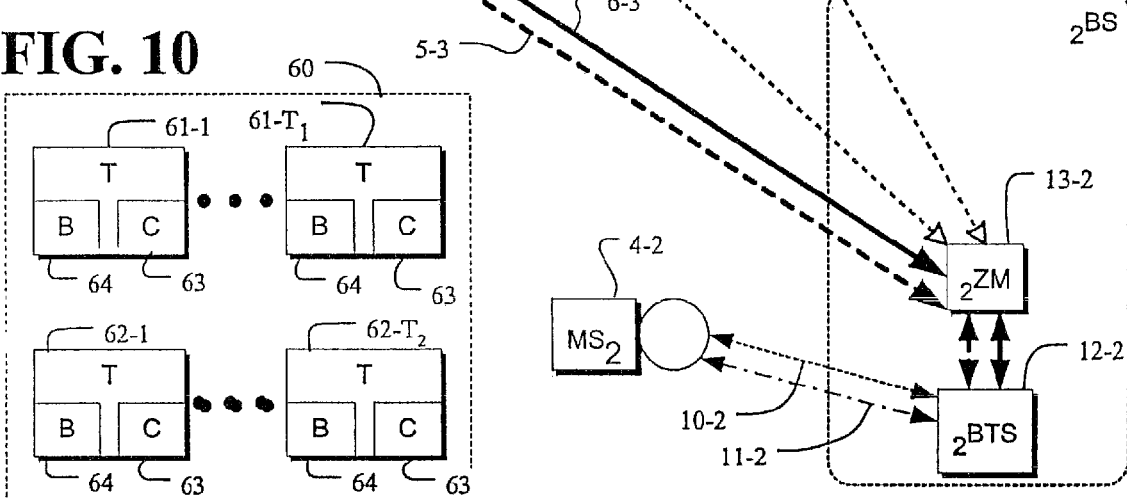
FIG. 10 depicts are presentation oft he transceivers which form a part of each of the base transceiver stations of FIG. 9.

FIG. 10 depicts a representation of the transceivers 60 which form a part of each of the base stations 2 of FIG. 9. In FIG. 10, the transceivers 61 and 62 each include a co-located broadcaster (B) and collector (C). When employing Space Division Multiple Access (SDMA) protocols, the transceivers 61 and 62 in some embodiments use smart antennas. The transceivers 61-1, . . . , 61-$T_1$ are the transceivers that are present in an ordinary GSM installation. The transceivers 62-1, . . . , 62-$T_2$ are the transceivers that are added in connection with fast macrodiversity switching. The transceivers 61 and 62 of FIG. 10 can be considered as a single pool allocated for any function in a base station 2 or can remain segregated so that the transceivers 61-1, . . . , 61-$T_1$, are allocated for ordinary base station operation and the transceiver 62-1, . . . , 62-$T_2$ are allocated by zone managers only for macrodiversity switching functions.

Figure 11:
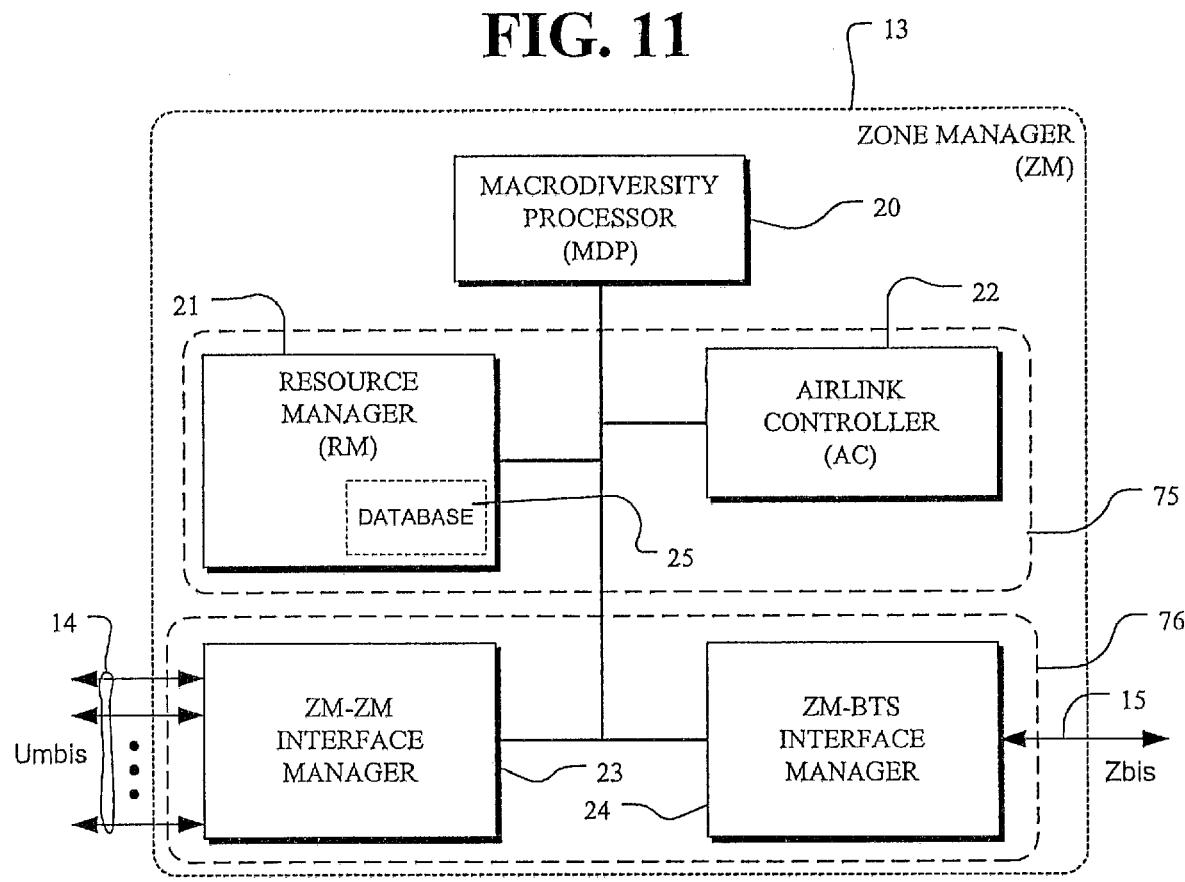
FIG. 11 depicts a schematic block diagram of a zone manager.

The function of each ZM 13 is to enable fast macrodiversity switching in the mobile wireless network. Its basic components are shown in FIG. 11. They are a macrodiversity processor (MDP) 20, control means 75 including resource manager, (RM) 21 and airlink controller (AC) 22, and interface means 76 including ZM-ZM interface manager 23 for the ZM-to-ZM links 14 (Umbis interface) and ZM-BTS interface manager 24 for the BTS-to-ZM transceiver link 15 (Zbis interface). The control means 75 issues broadcaster commands for controlling the down-link signals to each of selected ones of mobile stations and collector commands for controlling the plurality of macro-diverse collectors for switching the up-link signals for each of other selected ones of the mobile stations. Similar to the roles of host and assistant BTS, a distinction is made between host ZM and assistant ZM. A host ZM controls the fast macrodiversity switching services to the set of MS within the cell of the host BTS. An assistant ZM 13 provides fast macrodiversity switching services to the host ZM 13 for the same set of MS. Therefore, the role of a particular ZM 13 depends on the location of MS in the network. Any ZM 13 is a host ZM for the particular MS controlled by the host BTS and an assistant ZM for all other MSs.

In FIG. 11, the macrodiversity processor (MDP) 20 is a processor for processing the measurement and control signals used in controlling the fast macrodiversity switching of dedicated channels. The resource manager (RM) 21 functions to keep track of and control all of the resources, including BTS broadcasters and collectors, available used and unused channels and links, and other resources in the wireless network needed for fast macrodiversity switching. The airlink controller (AC) 22 is responsible for controlling the radio links among the BTSs and MSs via assistant ZMs and ZM-ZM links 14. The ZM-ZM interface manager 23 controls the ZM-to-ZM (Ubis) interface links 14 among zone managers 13 and supervises the zone manager network 55 of FIG. 9 for controlling the fast macrodiversity switching of dedicated channels. The ZM-BTS interface manager 24 functions to control the ZM-BTS link (Zbis) 15 between the ZM and BTS of a base station (BS).

The resource manager (RM) 21 within the ZM 13 controls the radio resources for fast macrodiversity switching services. In a typical BTS, a number of transceivers (see 61-1, . . . , 61-$T_1$ in FIG. 10) are installed to provide the radio links to an MS. In a BS 2 of FIG. 9, additional transceivers, called guest transceivers (see 61-1, . . . , 61 -$T_2$ in FIG. 10) are installed. These guest transceivers provide the additional radio resources useful in implementing fast macrodiversity switching. In the basic implementation, as discussed above, radio resources provided by the guest transceivers are managed by the RM 21, while the allocation of the host transceiver radio resources remains under BSC 16-1 control. The RM 21 keeps track of all used and idle host and guest radio resources available in its host BS including the transceivers of FIG. 10. It receives radio link information, for example in the form of measurement reports and other information, either directly from its corresponding ZM or from other ZM in assistant BSs via the ZM-to-ZM links 14. Since the transceiver stations communicate over a region containing one or more zones and the measurements are received from one or more collectors in the transceiver stations, the measurements from collectors include radio link conditions between a mobile station and the one or more collectors where the radio link information incorporates radio link conditions such as path loss, forward error rates, and carrier-to-interference ratio. The RM 21 in the host ZM also tracks radio resource usage in all assistant BSs through communications with the RMs in the assisting BSs. The RM 21 in the host BS stores and updates this information in a radio resource data base (DB) 25. During installation, all RMs are initialized with the identity of those BTSs in the network that are candidates for becoming assistant BTSs and the specific radio resources available in these BTSs. Alternatively, the ZM's may communicate with each other to determine the identity of assistant BTSs both at setup time and periodically during operation. When the MDP 20 requests a radio resource, the RM 21 checks the priority level of the request and the availability (in location, frequency, time slot or spreading code) of a radio resource suited to meet the request as stored in DB 25. If no such resource is available, or if the priority level of the request is insufficient, the request is denied. Otherwise, the radio resource is released and the data base 25 is updated accordingly. The assignment of the radio resource is also communicated to the other RMs in other ZMs for updating their respective data bases.

To perform the fast macrodiversity switching function, the ZM uses algorithms to track information in real time and to provide resource contention resolution, for the host BS as well as for all assistant BS, for each MS. The ZM controls the outgoing information flow on the links 14 to other ZMs including the bandwidth resources of the links 14 between host BS and assistant BSs. The process of controlling the resources of the links 14 is analogous to the process of controlling the radio resources.

In one implementation, the host and guest transceivers form a pool of radio resources for assignment by both the ZM and the BSC, or by the ZM alone. In the latter case, the ZM is responsible for tracking and assigning radio resources for the host cell, both for normal traffic and for the fast macrodiversity switching service.

The MDP 20 provides several functions. One function of MDP 20 is to extract radio link quality measurements over the ZM-to-BTS data link for all the MSs in the host cell. These measurements are processed to determine when a need for fast macrodiversity switching services exists and what priority level is appropriate. Another function of the MDP 20 is to determine which of the assistant BTSs is best suited to provide the service. This function is done by transfer of measurements from the MDP 20 in one ZM 13 to other MDPs in the other ZMs. The MDP 20 then sends requests with a priority level for an appropriate radio resource and for link bandwidth to the RM 21. If the resource is available, the down-link traffic data is sent to the ZM-BTS interface manager 24 for transmission to the assistant BTS. Similarly, the AC 22 is instructed to make the radio resource available with configuration for fast macrodiversity switching. Similarly, on the up-link, the assistant BTS is instructed to receive up-link traffic from the MS on the identified radio link and to forward the traffic to the host BTS.

Another function of the MDP 20 is to monitor the control channels relayed by the host BTS. In the event of a MS or BSC originated handover, the MDP 20 may intervene with the handover process and continue fast macrodiversity switching services, or discontinue fast macrodiversity switching services with the MS 20 controlling the handover.

A further function of the MDP 20 is the control of the fast macrodiversity switching switching speed. Depending on the shadow fading statistics, as determined by the radio link measurements, the MDP 20 uses internal speed algorithms to optimize the fast macrodiversity switching speed.

Another function of the MDP 20, in some embodiments, is to provide aggregation services. These aggregation services are similar to fast macrodiversity switching functions and are performed using the ZMs. In aggregation, more than one transceiver is communicating with a particular MS. On the down-link, this operation consists of transmitting signals from more than one broadcaster to the particular MS using the same radio resource. This service is only possible with MSs that have the ability to receive the signals received separately and process the received signals to obtain a resulting down-link signal with a higher confidence level than any of the individual down-link signals. On the up-link, aggregation consists of receiving the particular MS signal in the collector of the host BTS, together with the MS signal with collectors located at assistant BTSs, transmitting these up-link signals to the MDP 20 in the host BTS via the ZM-to-ZM data links 14, and processing these signals to form a resulting up-link signal with a higher confidence level than any of the individual up-link signals.

The AC 22 provides the ZM 13 with the ability to set certain parameters of the up-link and down-link radio links between a guest transceiver and a MS using macrodiversity services. By way of example, the AC 22 has the ability to determine and set transmit power settings. When a guest transceiver is assisting another BS to provide a radio link to a MS, the AC 22 informs the transceiver providing the radio resource for the fast macrodiversity switching service of the initial power level. Similarly, the AC is responsible for timing advance and for synchronizing the data transfer on the up-link and down-link during fast macrodiversity switching operations.

The ZM-to-ZM links 14 of FIG. 11 are used in fast macrodiversity switching. Referring to FIG. 6, a hierarchical control structure routes traffic between the PSTN 121 via a mobile switching center (MSC) 117 to an MS 4 through one of a number of BSCs (like BSC 16-1 in FIG. 6) and then through one of an even larger number of BTSs 12. With fast macrodiversity switching, however, up-link and down-link traffic is also routed between BTSs 12 through operation of the zone managers 13. In addition to routing traffic for fast macrodiversity switching services, the ZM-to-ZM links 14 are used in the control of the fast macrodiversity switching process. This fast macrodiversity switching control function is distributed among the ZMs. The data exchange between ZMs for providing each other with the measurement, resource and other information needed for fast macrodiversity switching services, is carried over the ZM-to-ZM links 14. The control of this information flow is managed by the RM 25 in each of the ZMs, but the formatting, organization of the data and the actual transmission is controlled by ZM-ZM interface mangers 23 in a zone manager at each end of a ZM-to-ZM link 14.

In FIG. 11, the ZM-ZM interface manager 23 provides latency control and bandwidth management across the ZM-to-ZM links 14. The ZM-ZM interface manager 23 also contributes to fast macrodiversity switching decision by monitoring the link utilization and quality of service over the ZM-to-ZM links 14.

The ZM-to-BTS link (Zbis) 15 is used to transport voice or data traffic, connection set-up information, control information (for MDP, RM, and AC functions) and fast macrodiversity switching traffic forwarded to other ZMs and BTSs. The control of this data flow in both directions is formatted and organized by the ZM-BTS interface managers in each zone manager.

The benefit provided by fast macrodiversity switching to mobile network operators in addition to using power control, frequency hopping, smart antennas and repeaters, is based on the fact, that all dedicated channels are operated, at all possible times, using the radio link with the lowest available path loss. This operation makes it possible to set the MS and the BTS transmitters at the lowest possible power levels. When implemented in the entire network, this leads to a reduction in the interference level, allowing operators to change the frequency reuse patterns and increase network capacity and throughput.

Figure 12:
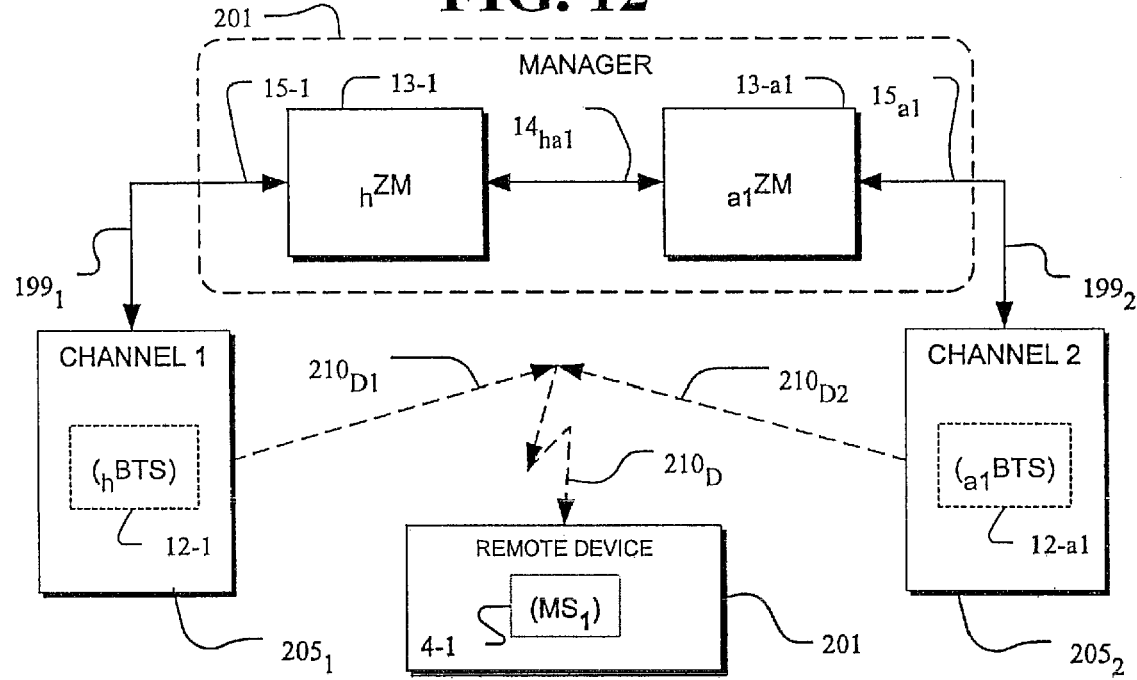
FIG. 12 depicts a schematic block diagram of zone managers interconnected to control interleave operations.

In FIG. 12, zone managers 13-1 and 13-a1 are interconnected to function as the manager 200 of FIG. 1 to control the interleave operation of channel $205_1$, including $_h$BTS 12-1, and the channel $205_2$, including $_{a1}$BTS 12-a1. In FIG. 12, the station 201 operates, for example, in the receive direction in which down link communications are received on the downlink $210_D$. The downlink $210_D$ is formed by the union of the downlink $210_{D1}$ from the transmitter of $_h$BTS 12-1 (see transmitter $T_1$ in transceiver 206$_1$ of FIG. 1) and the downlink $210_{D2}$ from the transmitter of $_{a1}$BTS 12-a1 (see transmitter $T_2$ of transceiver 206$_2$ in FIG. 1).

Figure 13:
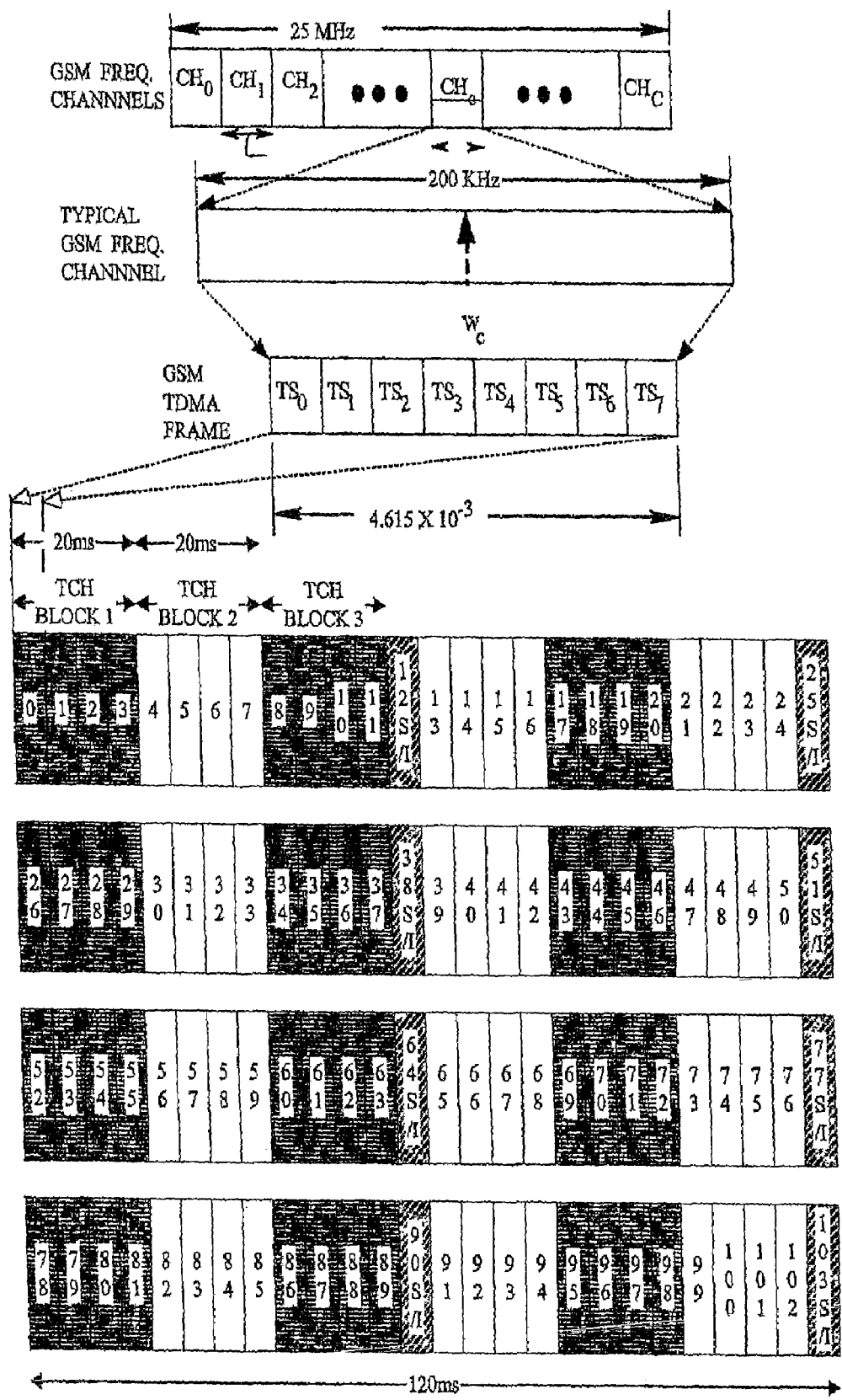
FIG. 13 depicts a representation of signal timing for TCH/FS and FACCH/FS interleaving operations in a GSM system.

In FIG. 13, a representation of the timing in a GSM system is shown. In the 800-900 MHz wireless spectrum, the GSM frequency channels occur in 25 MHz bands including the channels $CH_0, CH_1, CH_2, \ldots, CH_c, \ldots, CH_C$. Each one of the channels, such as typical channel $CH_c$, includes a 200 KHz band which represents atypical GSM frequency channel with a center frequency $\omega_c$. Each GSM frequency channel is further divided into eight time slots in a GSM TDMA frame including the time slots $TS_0, TS_1, \ldots, TS_7$. The GSM TDMA frame is (approximately $60/13 \times 10^{31}$ second).

For TCH/FS and FACCH/FS frames, each four frames forms a block. Each successive group of 26 GSM TDMA frames forms a superblock. Four successive superblocks together form one SACCH multiframe. After a set of three blocks, a SACCH frame occurs so that there are pairs of SACCH frames, at 12 and 25, at 38 and 51, at 64 and 77, and at 90 and 102. For each of these pairs of SACCH frames, one frame is usually idle and the other contains the SACCH data.

For interleaving in the TCH/FS and FACCH/FS frames, bits are split across successive blocks. For example, in FG. 13, a first block 1 includes frames 0,1,2,3, a second block 2 includes frames 4,5,6,7 and a third block 3 includes the frames 8,9,10,11. The bits in block 0 are allocated in two parts, $0_1$ and $0_2$ the bits in block 1 are allocated in two parts, $1_1$ and $1_2$, the bits in block 2 are allocated in two parts, $2_1$ and $2_2$ and the bits in block 3 are allocated in two parts, $3_1$ and $3_2$ and so on to block 24, The distribution of bits in each of the two parts is described above in connection with Eqs (1) for TCH/FS frames. For example, half of the bits, $2_2$, within block 2 are interleaved with half of the bits $1_1$ from block 1. Similarly, half of the bits, $2_1$, within block 2 are interleaved with half of the bits $3_2$ from block 3 and half of the bits, $3_1$, within block 3 are interleaved with half of the bits $4_2$ from block 4 all as determined by Eqs (1) above. The interleaving process results in the 456 coded bits being spread out over 8 blocks of 114 bits in sub-blocks of 57 bits each.

Each of the four frames together with SACCH frames in the 120 ms superblock represents approximately 20 ms of time and hence the diagonal interleaving processing between adjacent blocks inserts an inherent 40 ms offset delay for interleaved processing. Since the fast macrodiversity switching occurs with a switching frequency that can be 20 ms or less, the interleaving processing must be implemented to account for fast switching. As result of fast switching, split segment musts be processed to allow the interleave processing to properly complete.

TCH/FS Processing. TCH/FS blocks are diagonally interleaved over eight GSM frames. Macrodiversity site switching, in one example, occurs, as frequently as the timing for a single radio block (4 TCH/FS GSM frames), that is, within about a 20 ms switch time.

TCH/FS. The diagonal interleaving of TCH/FS over eight GSM frames results in two macrodiverse sites receiving only half of the required TCH/FS information on the uplink whenever a site switch (for example, from Channel 1 to Channel 2 in FIG. 1) occurs. Thus, neither uplink site can channel decode the interleaved TCH/FS block because of the absence of a needed split segment of interleaved data as a result of the fast switching. A number of methods are employed to process the split segments and thus to permit the decoding of the interleaved blocks.

Uplink TCH/FS Using Forwarding Partial TRAU Data to the Old/New Site. To account for the interleaving in a fast macrodiversity system, split segments after a fast switch are transmitted over the Umbis interface (links 14 of FIG. 7 through FIG. 9) so that the necessary "first one-half" of the bits necessary for interleave processing arrive at the same location as the "second one-half" of the bits necessary for interleave processing. In one method for assembly of the component segments, the old site forwards the partial TRAU (Trans Rate Adapter Unit) data over the Umbis interface to the new site, which uses the assembled old site data and the data received over the air link to combine and produce a TRAU data block. The TRAU data after interleave processing is sent to the host ZM for synchronization and formatting into standard TRAU frames. This method requires the forwarding of soft bits and hence can require high bandwidth. Soft bits are confidence metrics and other values commonly employed in processing of information for higher reliability.

Uplink TCH/FS Using Overlapped Resource Allocation. Resources are allocated at both sites (for example, at both Channel 1 and Channel 2 in FIG. 1) simultaneously for uplink reception for a period of one radio block to enable one site to enable both sites to receive split segments that were separated as a result of switching. This operation guarantees that each site will receive a complete TCH block with both split segments. Each site only transfers the completed block to the host ZM and drops any split segments. For this method each fast switch uses additional uplink receive resources for a period of one radio block. Compared to the method Forward Partial TRAU Data, this method does not require high Zbis or Umbis backhaul for transfer of split segments of interleaving data.

Uplink TCH/FS Using Dropping a Block. When uplink split segments are directed to different locations, the penalty for transferring the segments to the same location for interleave processing may not be necessary. In such a case, the block is merely dropped and normal processing continues without blocks having split segments. One speech block in the uplink direction will be dropped.

Downlink TCH/FS. When a site switch occurs during a TCH/FS block transfer, the new site must have the TCH/FS (or TRAU) data available so that it can be sent on the subsequent downlink frames in order for the MS to receive the TCH/FS block properly. In other words, on the downlink, the new site does not have the previous TRAU block available to send the correctly interleaved data on the next radio block so that a split segment of interleaved data is missing. A number of methods are employed to process the split segment and thus to permit the decoding of the interleaved blocks.

Downlink TCH/FS Using Forwarding Untransmitted TCH Data to the New Site. In this method, the pending (untransmitted) TCH data bits (split segment) are forwarded to the new site and the new site takes the segment of data bits and interleaves it with the TRAU blocks. This operation requires the ZM to be aware of when TCH blocks are being transmitted. Once the decision to switch has been made, only the untransmitted data bits are forwarded to the new site before the next GSM frame is scheduled.

Downlink TCH/FS Using Forwarding TRAU Data to the New Site. The entire TRAU data block (40 octets) is forwarded to the new site, which then codes it but transmits only the untransmitted block of data. This operation requires the ZM to be aware of when TRAU blocks are being transmitted. Once the decision to switch has been made, the layer 2 data block must be forwarded to the new site before the next GSM frame is scheduled.

Downlink TCH/FS Using Dropping a Block. When downlink split segments are directed to different locations, the penalty for transferring the segments for assembly at the same location for interleave processing may not be necessary. In such a case, the block is merely dropped and normal processing continues without blocks having split segments. One speech block in the downlink direction will be dropped.

FACCH/FS Processing. A FACCH/FS message is sent over eight frames. FACCH/FS messages are sent over the Um network by stealing a TRAU frame. The FACCH/FS data is interleaved with TCH/FS blocks. Uplink FACCH/FS. When a site switch occurs during a FACCH/FS block transfer, each of the sites receives only half the FACCH/FS data because of the split segments. Thus neither site can decode the FACCH/FS block because the split segments are at different locations.

Uplink FACCH/FS Using No Site Switching During FACCH/FS Transfer. This operation requires the ZM to be aware of when FACCH/FS blocks are being received so that it can inhibit site switching during a FACCH/FS uplink transfer and thus inhibit the formation of split segments. The receiving site informs the ZM about a FACCH/FS transfer in progress so that the ZM schedules site switching after the block is received. Additional switching delay of the order of one radio block (20 ms) is introduced into the system whenever a site switch is required during a FACCH/FS transfer.

Uplink FACCH/FS Using Forward Partial FACCH/FS Data to the Old/new Site. The old site forwards the partial FACCH/FS data to the old/new site, which uses the old data and the data received over the air to combine and produce a layer 2 data block. This layer 2 data is then sent to the host site for LAPDm processing. The problem with this method is that it requires forwarding of soft bits and hence requires increased bandwidth.

Uplink FACCH/FS Using Overlapped Resource Allocation. Resources are allocated at both sites simultaneously for uplink reception for a period of one radio block. This duplication guarantees that if a site switch happens during a FACCH/FS transfer, one of the sites will receive both segments that form the complete FACCH/FS block. That site then transfers the complete block to the host site for LAPDm processing. The other site drops the FACCH/FS split segment. In this method, each site participating in a switch requires additional uplink receive resources for a period of one radio block. Compared to other methods described herein, however, this method does not require high Zbis or Umbis backhaul bandwidth for transfer of forwarded data.

Downlink FACCH/FS. To avoid decoding problems at the MS, a number of methods are possible. For each method listed below, the ZM is aware of the FACCH/FS scheduling and the ZM establishes a protocol with the old and new site so that the new site can be instructed about what type of data is being forwarded (coded vs. uncoded bits) and the schedule controlling when the data is transmitted.

Downlink FACCH/FS Using No Site Switching During FACCH/FS Transfer. In this operation, the ZM is aware of when FACCH/FS blocks are being transmitted so that it can inhibit site switching during a FACCH/FS downlink transfer. Additional switching delay of the order of one radio block (20 ms) is introduced into the system whenever a site switch is required during a FACCH/FS transfer. This operation results in degraded FMS gain.

Downlink FACCH/FS Using Forward Untransmitted FACCH/FS Data to the New Site. Only the pending (untransmitted) data bits are forwarded to the new site. The new site takes this set of data bits and interleaves it with the TRAU blocks. This operation requires the ZM to be aware of when FACCH/FS blocks are being transmitted. Once the decision to switch has been made, only the untransmitted data bits must be forwarded to the new site before the next GSM frame is scheduled.

Downlink FACCH/FS Using Forward Layer2 Data to the New Site. The entire Layer2 data block (23 octets) is forwarded to the new site, which then codes it but transmits only the untransmitted block of data. In this operation, the ZM is aware of when FACCH/FS blocks are being transmitted. Once the decision to switch has been made, the layer 2 data block is forwarded to the new site before the next GSM frame is scheduled.

Figure 14:
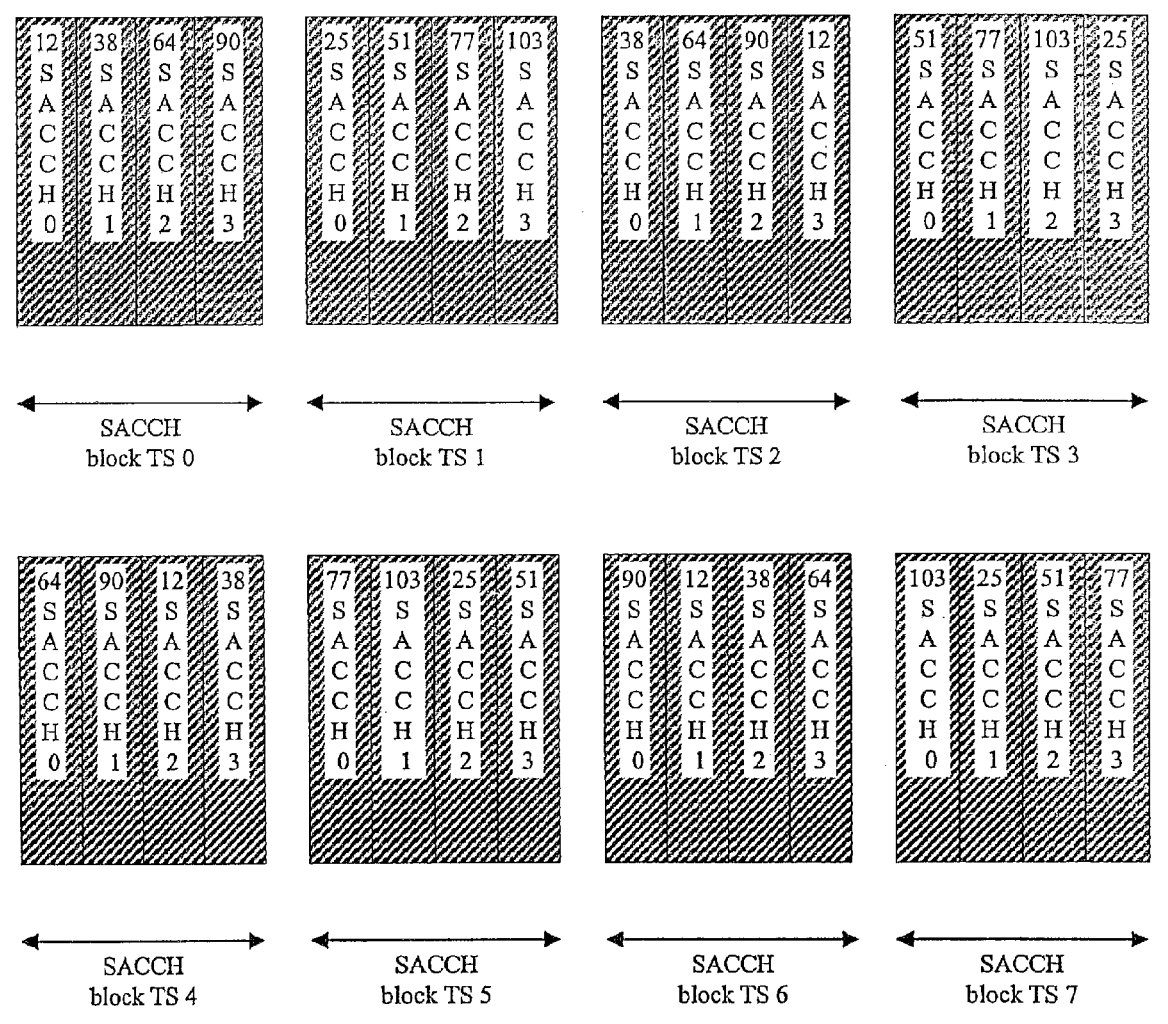

SACCH/FS Processing. In FIG. 14, the details of the SACCH/FS are shown The SACCH blocks in FIG. 14 are derived from FIG. 13 where SACCH frames (S) alternate with idle frames (I) in frames 12, 25, 38, 51, 64, 77, 90 and 103. With the alternation, the SACCH blocks TS0, TS1, TS7 use SACCH frames 12, 38, 64, 90; frames 25, 51, 77, 103; frames 38, 64, 90, 12; frames 51, 77, 103, 25; frames 64, 90, 12, 38; frames 77, 103, 25, 51; frames 90, 12, 38, 64; and frames 103, 25, 51, 77, respectively. Each SACCH block is spread over 480 ms. The processing of the uplink and downlink SACCH/FS signals is carried out to accommodate interleaving with fast macrodiversity switching.

Uplink SACCH/FS. In fast macrodiversity switching operations, a BTS sending the uplink voice traffic to the network (TRAU) can be switched at a fast rate (as often as about 20 ms) which is faster than a SACCH/FS period (480 ms). Hence, with fast macrodiversity switching, it is possible to receive one or more SACCH/FS frames of a SACCH block at one BTS and remaining frames of the SACCH/FS block at one or more other BTSs, perhaps at four different BTSs. Again, the problem of split segments is present. In effect, split SACCH segments for the same SACCH block, after switching, are located at different locations in the network. If fast macrodiversity uplink switching operates to wait until all SACCH frames for a SACCH block are received at a common site through normal operation, fast macrodiversity switching suffers in performance. Therefore, split segment processing is invoked to enhance performance.

In order to decode the SACCH/FS block, the split segments include all four SACCH frames for a SACCH block and these split segments are required to be at a common location in the network where they can be channel decoded. For channel decoding gain, each SACCH/FS frame for a SACCH block (frames SACCH 0, SACCH 1, SACCH 2 and SACCH 3) is required to store the soft decision value of the data bits.

Each SACCH/FS (normal) frame has 116 data bits. Typical channel decoders use 8 soft decision bits for data bits. Hence, each SACCH/FS frame has 116×8=928 soft bits. Two SACCH/FS frames have 1856 bits, three SACCH/FS frames have 2784 bits and four SACCH/FS frames, a SACCH/FS block, has 3712 soft bits. All SACCH/FS frames are moved to a common location in the network.

Uplink SACCH/FS Using No Macrodiversity In SACCH/FS. In this method, macrodiversity switching is not applied to SACCH/FS. The $_h$BBTS has the radio resources assigned to receive uplink SACCH/FS and does the decoding of SACCH/FS messages. This method does not require any data switching between BTSs and ZMs. This method has the advantage that it is simple to implement and the disadvantage that with no macrodiversity applied to SACCH/FS, the result may be poor SACCH/FS detection and hence possible call drop or handover.

Uplink SACCH/FS Using Always Send Soft Bits to $_h$ZM and $_h$ZM/$_h$BTS Does Channel Decoding. The $_s$BTS (a particular one of the assisting BTS, $_{a1}$BTS, . . . , $_{aa}$BTS in FIG. 7 through FIG. 9) sends the uplink SACCH/FS frame to its associated $_s$ZM over a Zbis link (see links 14 in FIG. 7 through FIG. 9). All four SACCH/FS frames are collected by the host zone manager, $_h$ZM. Upon receiving all four SACCH/FS frames, $_h$ZM performs the channel decoding function. In order to do the channel decoding function in $_h$ZM, $_h$ZM may require a DSP processing capability and hence this capability is added to the macrodiversity processor 20 of FIG. 11. Such operation requires the $_s$BTS to send 3712 bits to $_h$ZM every SACCH/FS block using the Zbis. Some of them may be also sent using a Umbis link. This method has the advantage of having uplink macrodiversity for SACCH/FS and therefore increases the reliability of detection of SACCH/FS. All the SACCH/FS frames are directed towards a same network location ($_h$ZM) and hence such operation makes the traffic more uniform and predictable. This method has the disadvantage that the average traffic over Zbis and Umbis will increase and requires access to soft bits in typical TRX systems. Also, $_h$Z may require DSP processing capability if decoding is done at the $_h$ZM. If the SACCH/FS block is sent back to $_h$BTS for decoding, then $_h$ZM does not need DSP processing capability. However, the traffic on Zbis will be higher and will increase delay in decoding the message.

Uplink SACCH/FS Using Switch Of Soft Bits Only On Uplink Switching, Last $_s$BTS Decodes the SACCH/FS Block. This method stores the soft bits of a SACCH/FS frame at the $_s$ BTS until uplink switching in requested by $_h$ZM. If there is no uplink switch during a SACCH/FS block, the $_s$BTS decodes the SACCH/FS and sends the SACCH/FS bits (184 bits) to $_h$BTS. In the event, there is an uplink site switch, $_h$ZM collects the soft bits from old $_s$BTS to send to the new $_s$BTS. This operation switches the soft bits of a SACCH/FS frame every time there is an uplink site switch. In a worst case scenario, it requires switching SACCH/FS frames around one, two or three SACCH/FS frames from the old $_s$BTS to the new $_s$BTS (assume 240 ms or lower switching time). Hence, on an average, the traffic on Zbis and Umbis interfaces is lower. However, the peak traffic requirement is much higher. This operation has the advantage of the use of uplink macrodiversity for SACCH/FS and increases the reliability of detection of SACCH/FS. This operation has the disadvantage of needing to switch data (soft bits) from an old $_s$BTS to a new $_s$ BTS in a short time interval and requires a high bandwidth link for Zbis and Umbis to accommodate peak traffic.

Uplink SACCH/FS Using Dynamic Decoding Implementation. This method uses access to soft bits in a typical TRX system. The $_h$ZM dynamically decides which BTS will perform the SACCH/FS decoding. The frame collected at an old or new $_s$BTS is forwarded to the BTS which will do the SACCH/FS decoding. If there is no uplink site switching, then the $_s$BTS receives the SACCH/FS frames and performs SACCH/FS decoding. If the uplink sites are switched during the SACCH/FS block period, then the $_h$ZM decides (based on the time of switch, the amount of soft bits required to be transferred, latency in processing due to soft bits transfer, and other factors) the best BTS to perform the SACCH/FS decoding. This method has the advantage of uplink macrodiversity for SACCH/FS, increases the reliability of detection of SACCH/FS and minimizes the data traffic of soft bits. The average traffic bandwidth requirement is less and peak traffic bandwidth requirement is less. This method has the disadvantage of requiring a complex algorithm running in the host zone manager, $_h$ZM, to determine the best BTS for SACCH/FS decoding and requiring the switching of soft bits from one BTS to another BTS. This method also requires a high band width link for Zbis and Umbis to accommodate peak traffic and requires access to soft bits in a typical TRX system.

Uplink SACCH/FS Using $_s$BTS Which Receives the First SACCH/FS Frame (SACCH/FS0) Will Continue Receiving Rest of the SACCH/FS Block. In this method where traffic causes a $_s$BTS switch, the $_s$BTS which is configured to receive the first SACCH/FS frame continues to receive the rest of the frames in the SACCH/FS block. If the $_h$ZM decides to switch to a new, $_s$BTS, it does so only for TCH/FS and FACCH/FS.

The SACCH/FS received are switched only at the end of a SACCH/FS block. This operation uses double the radio resources for up to 480 ms if the new $_s$BTS site is switched immediately after receiving the SACCH 0 frame. This method has the advantage of macrodiversity for SACCH/FS and increases the reliability of detection of SACCH/FS. There is no need to transfer soft bits between $_s$BTSs and the method does not require access to soft bits in a typical TRX system. This method has the disadvantage of a need for double the radio resources upon switching.

Downlink SACCH/FS. In macrodiversity, the BTS sending the downlink voice traffic can be switched at a rate faster than a SACCH/FS period (480 ms). Hence, it is possible to send one or more SACCH/FS frames from one BTS and the remaining frames of the SACCH/FS block from another BTS. Further, the four frames of SACCH/FS block are possibly sent from three or four different BTSs. Macrodiversity performance is imported if ZM delays the downlink site switching until the SACCH/FS block is completed. On Full Rate voice traffic, SYSINFO 5, SYSINFO 5 bis, SYSINFO 5ter and SYSINFO 6 are sent on downlink SACCH/FS.

System Information messages are sent by the network to MS giving information about the network. SYSINFOs are sent on BCCH and SACCH. During a voice traffic (TCH/FS), System Information messages are sent down to MS over SACCH/FS channel. Four different SYSINFO's are sent by the network during an active voice call namely, SYSINFO 5, SYSINFO 5bis, SYSINFO 5 ter and SYSINFO 6. SYSINFO 5 gives information on the BCCH allocation in the neighboring cells. SYSINFO 5 bis are SYSINFO 5 ter are sent optionally and gives information on the extension of the BCCH allocation in the neighboring cells. SYSINFO 6 gives information of location area identification, cell identity and various other information. The content of SYSINFO 5, 5bis, 5 ter and 6 do not change on call basis and hence can be sent to BTS as part of it its initialization process. SYSINMOs 5, 5bis and 5 ter at Layer 2 level are 18 octets in length and SYSINFO 6 at layer 2 is 11 octets in length.

The information content is the same for all the MS on that BCCH. The timing advance value and uplink power level are sent with SYSINFO's which are specific to each MS. The sequence to send SYSINFO is predetermined by the network. A SYSINFO message, power level and timing advance value are needed to encode the SACCH/FS block. Before encoding, the message can be as long as 184 bits. After encoding (parity, convolution encoder, interleaving), the SACCH/FS block is 456 bits. Each SACCH/FS block is divided into four SACCH/FS frames (SACCH/FS 0, SACCH/FS1, SACCH/FS2 and SACCH/FS3). Each SACCH/FS (normal) frame has 116 data bits. When the downlink site is switched, either the uncoded message or an encoded block needs to be sent to the new site. Encoded block (456 bits) is 2.5 times in size compared to an uncoded message block (184 bits).

Downlink SACCH/FS Using No Macrodiversity in SACCH/FS. Do not apply macrodiversity to SACCH/FS. The $_h$BTS has the radio resources assigned to transmit downlink SACCH/FS and does the encoding of SACCH/FS messages. This method does not require any data switching between BTSs and ZMs. This method has the advantage that it is simple to implement and has the disadvantage that no macrodiversity is applied to SACCH/FS and hence may result in poor detection of SACCH/FS at MS and hence possible call drop or hand over.

Downlink SACCH/FS Using $_s$BTS Always Receives the SSACCH/FS Message from $_h$ZM, $_s$BTS Does Channel Coding. The $_h$ZM sends the SACCH/FS message to the $_s$BTS and tell the $_s$BTS the GSM frame number to send the SACCH/FS block. The $_s$BTS does the channel encoding of the message and sends out the four SACCH/FS frames. In the event downlink site is switched, $_h$ZM send the message to new $_s$BTS and frame number to send SACCH/FS block. A new $_s$BTS encodes the SACCH/FS block and sends the remaining frame of SACCH/FS block. This method has the advantage of downlink macrodiversity for SACCH/FS and increases the reliability of detection of SACCH/FS at MS. A network node, $_h$ZM, controls all the SACCH/FS message distribution and hence makes the traffic more uniform and predictable. This method has the disadvantage that average traffic over Zbis and Umbis increases and, upon downlink switching, requires $_h$ZM to send the message to new $_s$BTS again. This operation is wasteful of Zbis and Umbis bandwidth in sending SACCH/FS messages to $_s$BTS every SACCH/FS block since the majority of the content of SACCH/FS messages (SYS-INFO) does not change.

Downlink SACCH/FS Using $_h$ZM Does the Channel Coding, $_s$BTS Always Receives the Channel-encoded Bits. $_h$ZM sends the SACCH/FS frames to the $_s$BTS and tells the $_s$BTS the frame number to which the SACCH/FS frame is to be sent. $_h$ZM does the channel encoding of the message and sends out the four SACCH/FS frames to the $_s$BTS. The $_h$ZM does not send all four frames ahead of time and stores the SACCH/FS frames until they are ready to be sent by a $_s$BTS. This method has the advantage of downlink macrodiversity for SACCH/FS that increases the reliability of detection of SACCH/FS at MS. A network node, $_h$ZM, controls all the SACCH/FS frames distribution and makes the traffic more uniform and predictable than for other methods. The SACCH/FS frames require 2.5 times the bandwidth compared to SACCH/FS message. This method has the disadvantage that average traffic over Zbis and Umbis will increase. It is wasteful of Zbis and Umbis bandwidth to send SACCH/FS frames to $_s$BTS since majority of the content of SACCH/FS message (SYSINFO) does not change. For this method, $_h$ZM DSP processing functionality is required for better performance.

Downlink SACCH/FS Using Each $_c$BTSs Configured to Send SYSINFOs, $_h$ZM Sends Power Level and Timing Advance Value to the $_s$BTS. The $_h$BTS is a home BTS that has a connection to the BSC for a particular call. The $_s$BTS is the serving BTS that is currently transmitting or scheduled to transmit to the MS. A $_c$BTS is a candidate to be an $_s$BTS and a number of $_c$BTS may exist. If the downlink site is switched, $_h$ZM sends power level and timing advance values to a new $_s$BTS. The $_h$ZM configures each $_c$BTS ahead of time. Hence, each $_c$BTS has SYSINFOs and the sequence to transmit it to a MS. At the beginning of every SACCH/FS block, the $_s$BTS uses power level and timing advance values before encoding the SACCH/FS block. Hence, the $_h$ZM sends that information (power level and a timing advance value) to $_s$BTS at the beginning of a SACCH/FS block. In the event that a message other than SYSINFO needs to be sent to MS, the $_h$ZM also sends that information to the $_s$BTS. If the downlink site is switched, the $_h$ZM sends the same information to a new $_s$BTS. The new $_s$BTS does the channel encoding and sends the remaining SACCH/FS frames. This method has the advantage of downlink macrodiversity for SACCH/FS and increases the reliability of detection of SACCH/FS at MS. The $_h$ZM only sends the additional information to $_s$BTS and reduces the traffic on Zbis and Umbis and hence reduces the traffic on Zbis and Umbis. This method has the disadvantage that each $_c$BTS is configured ahead of time and stores the configuration. Upon downlink switching, the $_h$ZM sends the message to a new $_s$BTS again.

While the invention has been particularly shown and described with reference to preferred embodiments thereof it will be understood by those skilled in the art that various changes in form and details may be made therein without departing from the scope of the invention.

The invention claimed is:

1. A communication system, comprising:
   a plurality of wireless channel devices, including at least two wireless channel devices that are not commonly located, each wireless channel device including:
      a transceiver unit configured to transmit and receive wireless signals to and from a mobile station across a plurality of channels, said wireless signals having segments with one or more component segments;
      an interleaver unit configured to change the order of segments in wireless signals being transmitted and received by the transceiver unit; and
   at least one zone manager, each zone manager including:
      a processor configured to process measurement and control signals used to control fast switching of dedicated ones of the plurality of channels;
      a control unit configured to issue broadcast commands to control down-link signals transmitted to the mobile station and collector commands to control a plurality of collectors configured to receive up-link signals from the mobile station; and
      an interface unit configured to provide an interface between the at least one zone manager and the transceiver unit.

2. The communication system of claim 1, wherein said communication system is a GSM system.

3. The communication system of claim 1, further comprising:
   a plurality of zone managers including the at least one zone manager, wherein one of the plurality of zone managers is configured to function as a host zone manager for said mobile station, and wherein one or more additional ones of the plurality of zone managers are each configured to function as an assistant zone manager for said mobile station;
   wherein the communications system further includes one or more additional mobile stations, wherein each zone manager is configured to act as a zone manager for a first one of the additional mobile stations and concurrently act as an assistant zone manager for a second one of the one or more additional mobile stations.

4. The communication system of claim 3, wherein said controller of each of said plurality of zone managers is responsive to information provided by its corresponding processor to perform said switching in accordance with a signal switch time determined as a function of a frame rate of an up-link signal.

5. The communication system of claim 4, wherein said switch time is determined based at least in part on an up-link signal frame rate of said up-link signal.

6. The communication system of claim 5, wherein said switch time is determined based at least in part on a multiple of a frame rate of said up-link signals.

7. The communication system of claim 4, wherein said switch time is less than 1 second.

8. The communication system of claim 3, wherein each of said plurality of zone managers is associated with a corresponding one of a plurality of transceiver units.

9. The communication system of claim 8, wherein each of said plurality of zone managers is co-located with its corresponding one of said plurality of transceiver units, and wherein said plurality of transceiver units are at macrodiverse locations.

10. The communication system of claim 9, wherein said plurality of zone managers are interconnected with each other to form a network.

11. The communication system of claim 8, wherein two or more of said plurality of zone managers are located at a common location.

12. The communication system of claim 11, wherein said common location is a base station controller in a cellular system.

13. The communication system of claim 8, wherein each of said plurality of transceiver units comprise:
   at least one broadcaster configured to broadcast down-link signals; and
   at least one collector configured to receive up-link signals.

14. The communication system of claim 3, wherein said control unit of each of said plurality of zone managers includes:
   a resource manager configured to manage available resources in said communication system;
   an airlink controller configured to control the radio channels in said communication system; and
   wherein said interface unit is further configured to provide interfaces to one or more other ones of said plurality of zone managers.

15. The communication system of claim 8, wherein said communication system includes a controller link connected between a base station controller and one of said plurality of transceiver units.

16. The communication system of claim 15, wherein said controller link comprises an Abis link.

17. The communication system of claim 15, wherein one or more of said plurality of zone managers is integrated into its corresponding one of said plurality of transceiver units.

18. The communication system of claim 1, wherein said wireless signals employ multiple access protocols.

19. The communication system of claim 18, wherein said wireless signals employ TDMA protocols.

20. The communication system of claim 1, wherein said transceiver unit is configured to communicate over a region containing one or more zones.

21. The communications system of claim 1, wherein each of wireless channel devices further includes a de-interleaver configured to change an order of segments comprised in received wireless signals from said interleaved order to said normal order.

22. A method, comprising:
   selecting a first of a plurality of wireless channel devices to receive and process wireless signals transmitted from a mobile station, said wireless signals including a plurality of segments that include component segments that are re-ordered from an original order to an altered order prior to transmission by the mobile station, and wherein selection of the first wireless channel device causes it to receive a first group of the re-ordered component segments from the mobile station;
   subsequently selecting a second one of the plurality of wireless channel devices to receive and process said wireless signals;
   dynamically switching to the second wireless channel device, causing the second wireless channel device to begin receiving and processing the wireless signals, and wherein said switching results in one or more of said first group of component segments being received but not processed by the first wireless channel device; and
   instructing the first wireless channel device to transmit, to the second wireless channel device, those ones of the first group of component segments that were received but not processed to enable the reassembly of the component segments into the original order.

23. The method of claim 22, wherein said dynamically switching further comprises switching as frequently as a signal switch time determined as a function of a signal frame rate.

24. The method of claim 23, wherein said signal switch time is approximately an up-link signal frame rate of said up-link signals.

25. The method of claim 23, wherein said signal switch time is a multiple of said up-link signal frame rate.

26. The method of claim 23, wherein said signal switch time is less than 1 second.

27. The method of claim 22, wherein said component segments are altered from said original order to said altered order in accordance with an interleaving algorithm.

28. The method of claim 22, further comprising receiving the wireless signals and restoring the order of said segments from said altered order to said original order subsequent to said receiving.

29. A zone manager, comprising:
   a processor configured to provide processor information to select among a plurality of transceiver stations to exchange wireless signals with a particular mobile station, the wireless signals comprising segments having one or more component segments, and wherein said wireless signals include up-link signals and down-link signals;
   a controller configured to dynamically switch among selected ones of said plurality of transceiver stations; and
   an interface unit configured to provide an interface to a corresponding one of the plurality of transceiver stations.

30. The zone manager of claim 29, wherein the zone manager is configured to function as a host zone manager for a first one of one or more mobile stations, and concurrently function as an assistant zone manager for a second of said one or more mobile stations.

31. The zone manager of claim 29, wherein said transceiver stations comprise:
   a plurality of broadcasters configured to broadcast said down-link signals; and
   a plurality of collectors configured to receive said up-link signals.

32. The zone manager of claim 29, wherein said zone manager is responsive to the processor information to switch said particular dedicated channel.

33. The zone manager of claim 29, wherein said zone manager includes a zone manager-to-zone manager interface manager configured to control links between said zone manager and one or more additional zone managers.

34. The zone manager of claim 29, wherein said wireless signals employ multiple access protocols.

35. The zone manager of claim 29, wherein said wireless signals employ TDMA protocols.

36. A communications system comprising:
   a plurality of transceiver stations;
   one or more mobile stations, wherein each of the plurality of transceiver stations is configured to transmit and receive wireless signals to and from the one or more mobile stations across a plurality of channels, said wireless signals comprising segments having one or more component segments, and wherein each of the one or more mobile stations and each of the plurality of transceiver stations includes an interleaver configured to change the order of segments from a first order to a second order prior to transmitting wireless signals comprising said segments; and a plurality of zone managers, each of the plurality of zone managers comprising:
- a processor configured to process measurement and control signals used to control fast switching of dedicated ones of the plurality of channels;
- a control unit configured to issue broadcast commands to control down-link signals transmitted to the mobile station and collector commands to control a plurality of collectors configured to receive up-link signals from the one or more mobile stations; and
- an interface unit configured to provide an interface to a corresponding one of the plurality of transceiver stations.

37. The communications system of claim 36, wherein each of the one or more mobile stations and each of the plurality of transceiver stations further includes a de-interleaver configured to change the order of segments in received wireless signals from said second order back to said first order.

38. The communications system of claim 36, wherein a selected one of the plurality of zone managers is configured to operate as a host zone manager for a first one of said one or more mobile stations and concurrently act as an assistant zone manager for a second one of said one or more mobile stations.

39. The communications system of claim 38, wherein the selected one of the plurality of zone managers, when acting as the host zone manager, is associated with one or more additional ones of the plurality of zone managers designated as assistant zone managers.

40. The communications system of claim 36, wherein each of the plurality of zone managers is associated with a corresponding one of the plurality of transceiver stations.

41. The communications system of claim 36, wherein the plurality of zone managers form an interconnected network of zone managers.

42. The communications system of claim 41, wherein each of the plurality of zone managers is co-located with a corresponding one of the plurality of transceiver stations.

43. The communications system of claim 36, wherein each of said plurality of transceiver stations is configured to communicate with ones of the one or more mobile stations located in a region containing one or more zones.

* * * * *